US 9,675,925 B2

(12) United States Patent
Ramkumar et al.

(10) Patent No.: US 9,675,925 B2
(45) Date of Patent: Jun. 13, 2017

(54) APPARATUS AND SYSTEM HAVING A VALVE ASSEMBLY AND SWING ADSORPTION PROCESSES RELATED THERETO

(71) Applicants: Shwetha Ramkumar, Cypress, TX (US); Robert A. Johnson, Doylesetown, PA (US); Eduardo Mon, Allentown, PA (US); John W. Fulton, Annandale, VA (US)

(72) Inventors: Shwetha Ramkumar, Cypress, TX (US); Robert A. Johnson, Doylesetown, PA (US); Eduardo Mon, Allentown, PA (US); John W. Fulton, Annandale, VA (US)

(73) Assignee: ExxonMobil Upstream Research Company, Spring, TX (US)

( * ) Notice: Subject to any disclaimer, the term of this patent is extended or adjusted under 35 U.S.C. 154(b) by 19 days.

(21) Appl. No.: 14/790,550

(22) Filed: Jul. 2, 2015

(65) Prior Publication Data
US 2016/0023155 A1 Jan. 28, 2016

Related U.S. Application Data

(60) Provisional application No. 62/029,258, filed on Jul. 25, 2014.

(51) Int. Cl.
B01D 53/047 (2006.01)
B01D 53/04 (2006.01)
G05D 7/06 (2006.01)

(52) U.S. Cl.
CPC ....... B01D 53/0446 (2013.01); B01D 53/047 (2013.01); B01D 53/0407 (2013.01);
(Continued)

(58) Field of Classification Search
CPC B01D 53/04; B01D 53/0407; B01D 53/0446; B01D 53/047; B01D 53/0473;
(Continued)

(56) References Cited

U.S. PATENT DOCUMENTS 1,868,138 A 7/1932 Fisk
2,600,435 A 6/1952 Shapiro ........................ 210/131
(Continued)

FOREIGN PATENT DOCUMENTS

CA 2297590 9/2000
CA 2237103 12/2001
(Continued)

OTHER PUBLICATIONS

Conviser, S. A. (1964) "Removal of $CO_2$ from Natural Gas With Molecular Sieves," *Proceedings of the Gas Conditioning Conf. Univ. of Oklahoma*, pp. 1F-12F.
(Continued)

*Primary Examiner* — Frank Lawrence
(74) *Attorney, Agent, or Firm* — ExxonMobil Upstream Research Company Law Dept.

(57) ABSTRACT

Provided are apparatus and systems having a lessened pulsation through the use of a pulse flow control mechanism. In performing a cyclical swing adsorption process, various streams are passed through adsorbent bed units during various steps in the swing adsorption process. The pulse flow control mechanism is utilized within a manifold of one of the streams to lessen pulsation within the manifold that results from performing the various steps.

60 Claims, 14 Drawing Sheets

(52) U.S. Cl.
CPC ..... *B01D 53/0473* (2013.01); *B01D 53/0476* (2013.01); *G05D 7/0682* (2013.01); *B01D 2256/24* (2013.01); *B01D 2256/245* (2013.01); *B01D 2257/304* (2013.01); *B01D 2257/502* (2013.01); *B01D 2257/504* (2013.01); *B01D 2257/702* (2013.01); *B01D 2259/40009* (2013.01); *B01D 2259/41* (2013.01)

(58) Field of Classification Search
CPC ............ B01D 53/0476; B01D 2256/24; B01D 2256/245; B01D 2257/304; B01D 2257/502; B01D 2257/504; B01D 2257/702; B01D 2259/40009; B01D 2259/41; G05D 7/0682
USPC ........................................ 95/96, 139; 96/121
See application file for complete search history.

(56) References Cited

U.S. PATENT DOCUMENTS

| | | | |
|---|---|---|---|
| 3,103,425 A | 9/1963 | Meyer | 55/62 |
| 3,124,152 A | 3/1964 | Payne | 137/269.5 |
| 3,142,547 A | 7/1964 | Marsh et al. | 55/26 |
| 3,508,758 A | 4/1970 | Strub | 277/15 |
| 3,602,247 A | 8/1971 | Bunn et al. | 137/270 |
| 3,788,036 A | 1/1974 | Lee et al. | 55/25 |
| 3,967,464 A | 7/1976 | Cormier et al. | 62/13 |
| 4,187,092 A | 2/1980 | Woolley | 62/48 |
| 4,207,084 A | 6/1980 | Gardner | 55/181 |
| 4,261,815 A | 4/1981 | Kelland | 209/213 |
| 4,324,565 A | 4/1982 | Benkmann | 55/23 |
| 4,325,565 A | 4/1982 | Winchell | 280/282 |
| 4,329,162 A | 5/1982 | Pitcher | 55/523 |
| 4,340,398 A | 7/1982 | Doshi et al. | 55/25 |
| 4,374,655 A | 2/1983 | Grodzka et al. | 55/163 |
| 4,386,947 A | 6/1983 | Mizuno et al. | 55/387 |
| 4,445,441 A | 5/1984 | Tanca | 110/165 |
| 4,461,630 A | 7/1984 | Cassidy et al. | 55/25 |
| 4,496,376 A | 1/1985 | Hradek | 55/163 |
| 4,560,393 A * | 12/1985 | Way | B01D 53/0423 95/138 |
| 4,689,062 A | 8/1987 | MacLean et al. | 62/18 |
| 4,705,627 A | 11/1987 | Miwa et al. | 210/264 |
| 4,711,968 A | 12/1987 | Oswald et al. | 568/454 |
| 4,737,170 A | 4/1988 | Searle | 55/179 |
| 4,770,676 A | 9/1988 | Sircar et al. | 55/26 |
| 4,783,205 A | 11/1988 | Searle | 55/161 |
| 4,784,672 A | 11/1988 | Sircar | 55/26 |
| 4,790,272 A | 12/1988 | Woolenweber | 123/188 |
| 4,814,146 A | 3/1989 | Brand et al. | 422/179 |
| 4,816,039 A | 3/1989 | Krishnamurthy et al. | 55/26 |
| 4,846,211 A | 7/1989 | Sheffler et al. | 137/119 |
| 4,877,429 A | 10/1989 | Hunter | 55/162 |
| 4,977,745 A | 12/1990 | Heichberger | 62/10 |
| 5,110,328 A | 5/1992 | Yokota et al. | 55/180 |
| 5,125,934 A | 6/1992 | Krishnamurthy et al. | 55/25 |
| 5,169,006 A | 12/1992 | Stelzer | 209/223.1 |
| 5,174,796 A | 12/1992 | Davis et al. | 55/26 |
| 5,224,350 A | 7/1993 | Mehra | 62/17 |
| 5,234,472 A | 8/1993 | Krishnamurthy et al. | 95/98 |
| 5,286,282 A | 2/1994 | Goodell et al. | 96/113 |
| 5,292,990 A | 3/1994 | Kantner et al. | 585/820 |
| 5,306,331 A | 4/1994 | Auvil et al. | 95/42 |
| 5,354,346 A | 10/1994 | Kumar | 95/101 |
| 5,365,011 A | 11/1994 | Ramachandran et al. | 585/829 |
| 5,370,728 A | 12/1994 | LaSala et al. | 95/101 |
| 5,486,227 A | 1/1996 | Kumar et al. | |
| 5,547,641 A | 8/1996 | Smith et al. | 422/181 |
| 5,565,018 A | 10/1996 | Baksh et al. | 95/100 |
| 5,623,970 A | 4/1997 | Schuh | |
| 5,662,727 A | 9/1997 | Castle et al. | 96/130 |
| 5,672,196 A | 9/1997 | Acharya et al. | 95/97 |
| 5,700,310 A | 12/1997 | Bowman et al. | 95/45 |
| 5,733,451 A | 3/1998 | Coellner et al. | 210/496 |
| 5,735,938 A | 4/1998 | Baksh et al. | 95/101 |
| 5,750,026 A | 5/1998 | Gadkaree et al. | 201/502.1 |
| 5,769,928 A | 6/1998 | Leavitt | |
| 5,792,239 A | 8/1998 | Reinhold, III et al. | 95/101 |
| 5,807,423 A | 9/1998 | Lemcoff et al. | 95/96 |
| 5,811,616 A | 9/1998 | Holub et al. | 585/504 |
| 5,827,358 A | 10/1998 | Kulish et al. | 96/115 |
| 5,906,673 A | 5/1999 | Reinhold, III et al. | 95/45 |
| 5,912,426 A | 6/1999 | Smolarek et al. | |
| 5,924,307 A | 7/1999 | Nenov | 62/643 |
| 5,935,444 A | 8/1999 | Johnson et al. | 210/691 |
| 5,968,234 A | 10/1999 | Midgett, II et al. | 95/120 |
| 5,976,221 A | 11/1999 | Bowman et al. | 95/45 |
| 5,997,617 A | 12/1999 | Czabala et al. | 96/130 |
| 6,007,606 A | 12/1999 | Baksh et al. | 95/98 |
| 6,010,555 A * | 1/2000 | Smolarek | B01D 53/0476 95/101 |
| 6,011,192 A | 1/2000 | Baker et al. | 585/818 |
| 6,023,942 A | 2/2000 | Thomas et al. | 62/613 |
| 6,053,966 A | 4/2000 | Moreau et al. | 95/96 |
| 6,063,161 A | 5/2000 | Keefer et al. | 95/100 |
| 6,096,115 A | 8/2000 | Kleinberg | |
| 6,099,621 A | 8/2000 | Ho | 95/139 |
| 6,129,780 A | 10/2000 | Millet et al. | 95/117 |
| 6,136,222 A | 10/2000 | Friesen et al. | 252/184 |
| 6,147,126 A | 11/2000 | DeGeorge et al. | 518/715 |
| 6,152,991 A | 11/2000 | Ackley | |
| 6,156,101 A | 12/2000 | Naheiri | |
| 6,171,371 B1 | 1/2001 | Derive et al. | 95/98 |
| 6,176,897 B1 | 1/2001 | Keefer | 95/98 |
| 6,179,900 B1 | 1/2001 | Behling et al. | 95/45 |
| 6,183,538 B1 | 2/2001 | Naheiri | |
| 6,194,079 B1 | 2/2001 | Hekal | 428/566 |
| 6,210,466 B1 | 4/2001 | Whysall et al. | 95/100 |
| 6,231,302 B1 | 5/2001 | Bonardi | 415/105 |
| 6,245,127 B1 | 6/2001 | Kane et al. | 95/101 |
| 6,284,021 B1 | 9/2001 | Lu et al. | 95/96 |
| 6,311,719 B1 | 11/2001 | Hill et al. | 137/312 |
| 6,345,954 B1 | 2/2002 | Al-Himyary et al. | 415/112 |
| 6,398,853 B1 | 6/2002 | Keefer et al. | 96/125 |
| 6,402,813 B2 | 6/2002 | Monereau et al. | 95/96 |
| 6,406,523 B1 | 6/2002 | Connor et al. | 96/125 |
| 6,425,938 B1 | 7/2002 | Xu et al. | |
| 6,432,379 B1 | 8/2002 | Heung | 423/648.1 |
| 6,436,171 B1 | 8/2002 | Wang et al. | 95/96 |
| 6,444,012 B1 | 9/2002 | Dolan et al. | 95/99 |
| 6,444,014 B1 | 9/2002 | Mullhaupt et al. | 95/130 |
| 6,444,523 B1 | 9/2002 | Fan et al. | 438/257 |
| 6,451,095 B1 | 9/2002 | Keefer et al. | 96/125 |
| 6,457,485 B2 | 10/2002 | Hill et al. | 137/240 |
| 6,471,939 B1 | 10/2002 | Boix et al. | 423/706 |
| 6,488,747 B1 | 12/2002 | Keefer | 96/125 |
| 6,497,750 B2 | 12/2002 | Butwell et al. | 95/96 |
| 6,500,234 B1 | 12/2002 | Ackley et al. | |
| 6,500,241 B2 | 12/2002 | Reddy | 96/134 |
| 6,500,404 B1 | 12/2002 | Camblor Fernandez et al. | 423/706 |
| 6,503,299 B2 | 1/2003 | Baksh et al. | 95/98 |
| 6,506,351 B1 | 1/2003 | Jain et al. | 423/239.1 |
| 6,514,318 B2 | 2/2003 | Keefer | 95/96 |
| 6,514,319 B2 | 2/2003 | Keefer et al. | 95/101 |
| 6,517,609 B1 | 2/2003 | Monereau et al. | 95/96 |
| 6,531,516 B2 | 3/2003 | Davis et al. | 518/700 |
| 6,533,846 B1 | 3/2003 | Keefer et al. | 96/125 |
| 6,565,627 B1 | 5/2003 | Golden et al. | 95/96 |
| 6,565,635 B2 | 5/2003 | Keefer et al. | 96/125 |
| 6,565,825 B2 | 5/2003 | Ohji et al. | 423/625 |
| 6,572,678 B1 | 6/2003 | Wijmans et al. | 95/47 |
| 6,579,341 B2 | 6/2003 | Baker et al. | 95/39 |
| 6,593,541 B1 | 7/2003 | Herren | 219/121.67 |
| 6,595,233 B2 | 7/2003 | Pulli | 137/115.05 |
| 6,605,136 B1 | 8/2003 | Graham et al. | 95/98 |
| 6,607,584 B2 | 8/2003 | Moreau et al. | 95/117 |
| 6,630,012 B2 | 10/2003 | Wegeng et al. | 95/106 |
| 6,631,626 B1 | 10/2003 | Hahn | 62/612 |
| 6,641,645 B1 | 11/2003 | Lee et al. | 95/98 |
| 6,651,645 B1 | 11/2003 | Nunez-Suarez | 126/9 R |
| 6,660,064 B2 | 12/2003 | Golden et al. | 95/96 |
| 6,660,065 B2 | 12/2003 | Byrd et al. | 95/117 |

(56) References Cited

U.S. PATENT DOCUMENTS

| | | | |
|---|---|---|---|
| 6,692,626 B2 | 2/2004 | Keefer et al. ............... 204/491 |
| 6,712,087 B2 | 3/2004 | Hill et al. .................... 137/240 |
| 6,742,507 B2 | 6/2004 | Keefer et al. ............... 123/585 |
| 6,746,515 B2 | 6/2004 | Wegeng et al. ................. 95/96 |
| 6,752,852 B1 | 6/2004 | Jacksier et al. ................ 95/117 |
| 6,770,120 B2 | 8/2004 | Neu et al. ........................ 95/96 |
| 6,773,225 B2 | 8/2004 | Yuri et al. ......................... 415/1 |
| 6,802,889 B2 | 10/2004 | Graham et al. ................. 95/96 |
| 6,814,771 B2 | 11/2004 | Scardino et al. ............. 55/385.3 |
| 6,835,354 B2 | 12/2004 | Woods et al. .................. 422/139 |
| 6,840,985 B2 | 1/2005 | Keefer ............................ 96/125 |
| 6,866,950 B2 | 3/2005 | Connor et al. ................. 429/13 |
| 6,889,710 B2 | 5/2005 | Wagner .................... 137/625.46 |
| 6,890,376 B2 | 5/2005 | Arquin et al. .................. 96/134 |
| 6,893,483 B2 | 5/2005 | Golden et al. .................... 95/96 |
| 6,902,602 B2 | 6/2005 | Keefer et al. .................... 95/97 |
| 6,916,358 B2 | 7/2005 | Nakamura et al. ............. 95/96 |
| 6,918,953 B2 | 7/2005 | Lomax, Jr. et al. ............ 96/130 |
| 6,921,597 B2 | 7/2005 | Keefer et al. ................... 429/34 |
| 6,974,496 B2 | 12/2005 | Wegeng et al. ................. 96/126 |
| 7,025,801 B2 | 4/2006 | Monereau .......................... 95/8 |
| 7,027,929 B2 | 4/2006 | Wang .............................. 702/17 |
| 7,029,521 B2 | 4/2006 | Johansson ...................... 96/128 |
| 7,074,323 B2 | 7/2006 | Ghijsen ......................... 208/101 |
| 7,077,891 B2 | 7/2006 | Jaffe et al. ..................... 96/108 |
| 7,087,331 B2 | 8/2006 | Keefer et al. .................. 429/17 |
| 7,094,275 B2 | 8/2006 | Keefer et al. ................... 96/126 |
| 7,097,925 B2 | 8/2006 | Keefer .............................. 429/9 |
| 7,112,239 B2 | 9/2006 | Kimbara et al. ............... 96/108 |
| 7,117,669 B2 | 10/2006 | Kaboord et al. ................ 60/288 |
| 7,122,073 B1 | 10/2006 | Notaro et al. |
| 7,128,775 B2 | 10/2006 | Celik et al. ....................... 95/96 |
| 7,144,016 B2 | 12/2006 | Gozdawa ...................... 277/399 |
| 7,160,356 B2 | 1/2007 | Koros et al. ...................... 95/50 |
| 7,160,367 B2 | 1/2007 | Babicki et al. .................. 96/116 |
| 7,166,149 B2 | 1/2007 | Dunne et al. ................... 95/113 |
| 7,172,645 B1 | 2/2007 | Pfister et al. ................... 95/116 |
| 7,189,280 B2 | 3/2007 | Alizadeh-Khiavi et al. ... 95/130 |
| 7,250,073 B2 | 7/2007 | Keefer et al. .................... 95/96 |
| 7,250,074 B2 | 7/2007 | Tonkovich et al. ............ 95/130 |
| 7,255,727 B2 | 8/2007 | Monereau et al. .............. 95/96 |
| 7,258,725 B2 | 8/2007 | Ohmi et al. ...................... 95/41 |
| 7,276,107 B2 | 10/2007 | Baksh et al. ..................... 95/96 |
| 7,279,029 B2 | 10/2007 | Occhialini et al. ............. 96/121 |
| 7,285,350 B2 | 10/2007 | Keefer et al. ................... 429/34 |
| 7,297,279 B2 | 11/2007 | Johnson et al. ............... 210/669 |
| 7,311,763 B2 | 12/2007 | Neary ............................ 96/121 |
| RE40,006 E | 1/2008 | Keefer et al. .................. 95/100 |
| 7,314,503 B2 | 1/2008 | Landrum et al. ................ 95/50 |
| 7,354,562 B2 | 4/2008 | Ying et al. ................. 423/437.2 |
| 7,387,849 B2 | 6/2008 | Keefer et al. ................... 429/34 |
| 7,390,350 B2 | 6/2008 | Weist, Jr. et al. ............. 95/100 |
| 7,399,346 B2 | 7/2008 | van der Maas ............. 96/117.5 |
| 7,404,846 B2 | 7/2008 | Golden et al. ................. 95/103 |
| 7,438,079 B2 | 10/2008 | Cohen et al. |
| 7,449,049 B2 | 11/2008 | Thomas et al. ................. 95/123 |
| 7,456,131 B2 | 11/2008 | Klett et al. ..................... 502/417 |
| 7,510,601 B2 | 3/2009 | Whitley et al. ................. 96/121 |
| 7,527,670 B2 | 5/2009 | Ackley et al. .................... 95/96 |
| 7,553,568 B2 | 6/2009 | Keefer ............................ 429/13 |
| 7,578,864 B2 | 8/2009 | Watanabe et al. .............. 55/523 |
| 7,604,682 B2 | 10/2009 | Seaton ............................. 95/96 |
| 7,608,136 B2 | 10/2009 | van der Maas ............. 96/117.5 |
| 7,637,989 B2 | 12/2009 | Bong .............................. 96/130 |
| 7,641,716 B2 | 1/2010 | Lomax, Jr. et al. .............. 95/96 |
| 7,645,324 B2 | 1/2010 | Rode et al. ....................... 95/96 |
| 7,651,549 B2 | 1/2010 | Whitley ........................... 95/96 |
| 7,674,319 B2 | 3/2010 | Lomax, Jr. et al. ............. 95/19 |
| 7,674,539 B2 | 3/2010 | Keefer et al. ................... 429/17 |
| 7,687,044 B2 | 3/2010 | Keefer et al. .................. 422/211 |
| 7,713,333 B2 | 5/2010 | Rege et al. ...................... 95/96 |
| 7,717,981 B2 | 5/2010 | LaBuda et al. .................. 95/96 |
| 7,722,700 B2 | 5/2010 | Sprinkle .......................... 95/22 |
| 7,731,782 B2 | 6/2010 | Kelley et al. ................... 95/139 |
| 7,740,687 B2 | 6/2010 | Reinhold, III ................... 95/96 |
| 7,744,676 B2 | 6/2010 | Leitmayr et al. ................ 95/99 |
| 7,744,677 B2 | 6/2010 | Barclay et al. ................. 95/114 |
| 7,758,051 B2 | 7/2010 | Roberts-Haritonov et al. ............................ 277/401 |
| 7,758,988 B2 | 7/2010 | Keefer et al. ................... 429/34 |
| 7,763,098 B2 | 7/2010 | Alizadeh-Khiavi et al. ..... 95/96 |
| 7,763,099 B2 | 7/2010 | Verma et al. ..................... 95/96 |
| 7,792,983 B2 | 9/2010 | Mishra et al. ................ 709/231 |
| 7,793,675 B2 | 9/2010 | Cohen et al. |
| 7,806,965 B2 | 10/2010 | Stinson ........................... 95/187 |
| 7,814,934 B2 | 10/2010 | Thelen .......................... 137/597 |
| 7,819,948 B2 | 10/2010 | Wagner .......................... 95/100 |
| 7,828,877 B2 | 11/2010 | Sawada et al. ................... 95/96 |
| 7,828,880 B2 | 11/2010 | Moriya et al. .................. 95/210 |
| 7,854,793 B2 | 12/2010 | Rarig et al. ..................... 96/116 |
| 7,858,169 B2 | 12/2010 | Yamashita .................... 428/116 |
| 7,862,645 B2 | 1/2011 | Whitley et al. .................. 95/96 |
| 7,867,320 B2 | 1/2011 | Baksh et al. ..................... 95/96 |
| 7,902,114 B2 | 3/2011 | Keefer et al. |
| 7,938,886 B2 | 5/2011 | Hershkowitz et al. ......... 95/115 |
| 7,947,118 B2 | 5/2011 | Rarig et al. ..................... 95/98 |
| 7,947,120 B2 | 5/2011 | Deckman et al. .............. 95/139 |
| 7,959,720 B2 | 6/2011 | Deckman et al. .............. 96/130 |
| 8,016,918 B2 | 9/2011 | LaBuda et al. .................. 95/96 |
| 8,034,164 B2 | 10/2011 | Lomax, Jr. et al. ............ 95/121 |
| 8,071,063 B2 | 12/2011 | Reyes et al. .................. 423/248 |
| 8,128,734 B2 | 3/2012 | Song ................................ 95/96 |
| 8,142,745 B2 | 3/2012 | Reyes et al. ............... 423/213.2 |
| 8,142,746 B2 | 3/2012 | Reyes et al. ............... 423/213.2 |
| 8,192,709 B2 | 6/2012 | Reyes et al. ............... 423/245.1 |
| 8,210,772 B2 | 7/2012 | Gillecriosd ................ 405/128.2 |
| 8,216,343 B2 | 7/2012 | Ackley et al. .................... 95/96 |
| 8,227,121 B2 | 7/2012 | Adams et al. ................. 429/429 |
| 8,262,773 B2 | 9/2012 | Northrop et al. ............... 95/114 |
| 8,262,783 B2 | 9/2012 | Stoner et al. ................... 96/108 |
| 8,268,043 B2 | 9/2012 | Celik et al. ....................... 95/96 |
| 8,268,044 B2 | 9/2012 | Wright et al. .................... 95/96 |
| 8,272,401 B2 | 9/2012 | McLean .................... 137/625.11 |
| 8,287,629 B2 | 10/2012 | Fujita et al. .................... 96/126 |
| 8,319,090 B2 | 11/2012 | Kitamura ...................... 136/244 |
| 8,337,594 B2 | 12/2012 | Corma Canos et al. ....... 95/130 |
| 8,361,200 B2 | 1/2013 | Sayari et al. ................... 95/139 |
| 8,361,205 B2 | 1/2013 | Desai et al. .................... 96/121 |
| 8,377,173 B2 | 2/2013 | Chuang .......................... 95/135 |
| 8,444,750 B2 | 5/2013 | Deckman et al. ................ 95/96 |
| 8,470,395 B2 | 6/2013 | Khiavi et al. ................. 427/180 |
| 8,480,795 B2 | 7/2013 | Siskin et al. ................... 95/235 |
| 8,512,569 B2 | 8/2013 | Eaton et al. .................. 210/650 |
| 8,518,356 B2 | 8/2013 | Schaffer et al. .............. 423/220 |
| 8,529,662 B2 | 9/2013 | Kelley et al. .................... 95/96 |
| 8,529,663 B2 | 9/2013 | Reyes et al. ..................... 95/96 |
| 8,529,664 B2 | 9/2013 | Deckman et al. ................ 95/96 |
| 8,529,665 B2 | 9/2013 | Manning et al. ................. 95/96 |
| 8,535,414 B2 | 9/2013 | Johnson et al. .................. 95/95 |
| 8,545,602 B2 | 10/2013 | Chance et al. ................... 95/96 |
| 8,551,444 B2 | 10/2013 | Agnihotri et al. .......... 423/648.1 |
| 8,573,124 B2 | 11/2013 | Havran et al. ................ 102/206 |
| 8,591,627 B2 | 11/2013 | Jain ................................. 95/52 |
| 8,591,634 B2 | 11/2013 | Winchester et al. ............ 96/127 |
| 8,616,233 B2 | 12/2013 | McLean et al. .......... 137/246.22 |
| 8,657,922 B2 | 2/2014 | Yamawaki et al. .............. 95/96 |
| 8,673,059 B2 | 3/2014 | Leta et al. ...................... 95/104 |
| 8,680,344 B2 | 3/2014 | Weston et al. |
| 8,715,617 B2 | 5/2014 | Genkin et al. ................ 423/652 |
| 8,752,390 B2 | 6/2014 | Wright et al. ................... 60/780 |
| 8,778,051 B2 | 7/2014 | Weist, Jr. et al. ............... 95/98 |
| 8,784,533 B2 | 7/2014 | Leta et al. ....................... 95/97 |
| 8,784,534 B2 | 7/2014 | Kamakoti et al. ............... 95/97 |
| 8,784,535 B2 | 7/2014 | Ravikovitch et al. ........... 95/98 |
| 8,795,411 B2 | 8/2014 | Hufton et al. ................... 95/90 |
| 8,808,425 B2 | 8/2014 | Genkin et al. ................... 95/96 |
| 8,808,426 B2 | 8/2014 | Sundaram ....................... 95/96 |
| 8,814,985 B2 | 8/2014 | Gerds et al. ..................... 95/90 |
| 8,852,322 B2 | 10/2014 | Gupta et al. ................... 95/136 |
| 8,858,683 B2 | 10/2014 | Deckman ......................... 95/96 |
| 8,875,483 B2 | 11/2014 | Wettstein ..................... 60/39.52 |
| 8,906,138 B2 | 12/2014 | Rasmussen et al. ............. 95/96 |
| 8,921,637 B2 | 12/2014 | Sundaram et al. ............ 585/823 |
| 8,939,014 B2 | 1/2015 | Kamakoti et al. ............... 73/38 |

(56) References Cited

U.S. PATENT DOCUMENTS

| | | |
|---|---|---|
| 9,005,561 B2 | 4/2015 | Leta |
| 9,017,457 B2 | 4/2015 | Tammera .......................... 95/96 |
| 9,028,595 B2 | 5/2015 | Sundaram et al. |
| 9,034,078 B2 | 5/2015 | Wanni et al. ...................... 95/8 |
| 9,034,079 B2 | 5/2015 | Deckman et al. ................. 95/96 |
| 9,050,553 B2 | 6/2015 | Alizadeh-Khiavi et al. |
| 9,067,168 B2 | 6/2015 | Frederick et al. .............. 96/108 |
| 9,095,809 B2 | 8/2015 | Deckman et al. ................. 95/45 |
| 9,108,145 B2 | 8/2015 | Kalbassi et al. ................... 95/8 |
| 9,120,049 B2 | 9/2015 | Sundaram et al. ............. 96/121 |
| 9,126,138 B2 | 9/2015 | Deckman et al. ................. 95/95 |
| 9,162,175 B2 | 10/2015 | Sundaram ....................... 96/121 |
| 9,168,485 B2 | 10/2015 | Deckman et al. ................. 95/96 |
| 2001/0047824 A1 | 12/2001 | Hill et al. ....................... 137/312 |
| 2002/0053547 A1 | 5/2002 | Schlegel et al. |
| 2002/0124885 A1 | 9/2002 | Hill et al. ....................... 137/312 |
| 2002/0162452 A1 | 11/2002 | Butwell et al. .................... 95/96 |
| 2003/0075485 A1 | 4/2003 | Ghijsen ........................... 208/308 |
| 2003/0129101 A1 | 7/2003 | Zettel .............................. 422/179 |
| 2003/0131728 A1 | 7/2003 | Kanazirev et al. ................ 95/96 |
| 2003/0170527 A1 | 9/2003 | Finn et al. ....................... 429/34 |
| 2003/0202918 A1 | 10/2003 | Ashida et al. .................. 422/180 |
| 2003/0205130 A1 | 11/2003 | Neu et al. ......................... 95/90 |
| 2003/0223856 A1 | 12/2003 | Yuri et al. ........................... 415/1 |
| 2004/0099142 A1 | 5/2004 | Arquin et al. .................... 96/134 |
| 2004/0118277 A1 | 6/2004 | Kim et al. |
| 2004/0197596 A1 | 10/2004 | Connor et al. .................. 428/630 |
| 2004/0232622 A1 | 11/2004 | Gozdawa ........................ 277/401 |
| 2005/0005771 A1 | 1/2005 | Lomax et al. |
| 2005/0014511 A1 | 1/2005 | Spain ................................ 96/124 |
| 2005/0109419 A1 | 5/2005 | Ohmi et al. ...................... 141/4 |
| 2005/0114032 A1 | 5/2005 | Wang .............................. 702/14 |
| 2005/0129952 A1 | 6/2005 | Sawada et al. ................. 428/409 |
| 2005/0145111 A1 | 7/2005 | Keefer et al. .................... 96/124 |
| 2005/0150378 A1 | 7/2005 | Dunne et al. .................... 95/113 |
| 2005/0229782 A1 | 10/2005 | Monereau et al. ................ 95/96 |
| 2005/0252378 A1 | 11/2005 | Celik et al. ..................... 96/121 |
| 2006/0017940 A1 | 1/2006 | Takayama |
| 2006/0048648 A1 | 3/2006 | Gibbs et al. .................... 96/108 |
| 2006/0049102 A1 | 3/2006 | Miller et al. ............. 210/500.27 |
| 2006/0076270 A1 | 4/2006 | Poshusta et al. ............... 208/208 |
| 2006/0099096 A1 | 5/2006 | Shaffer et al. ................. 418/55.1 |
| 2006/0105158 A1 | 5/2006 | Fritz et al. ..................... 428/317.9 |
| 2006/0162556 A1 | 7/2006 | Ackley et al. .................... 95/96 |
| 2006/0165574 A1 | 7/2006 | Sayari ............................. 423/210 |
| 2006/0169140 A1* | 8/2006 | Lomax, Jr. ............ B01D 53/047 95/96 |
| 2006/0169142 A1 | 8/2006 | Rode et al. ..................... 96/129 |
| 2006/0236862 A1 | 10/2006 | Golden et al. .................... 95/96 |
| 2006/0243133 A1 | 11/2006 | Hart et al. |
| 2007/0084241 A1 | 4/2007 | Kretchmer et al. ............ 63/29.2 |
| 2007/0084344 A1 | 4/2007 | Moriya et al. .................... 95/210 |
| 2007/0222160 A1 | 9/2007 | Roberts-Haritonov et al. ............................ 277/387 |
| 2007/0253872 A1 | 11/2007 | Keefer et al. ................... 422/143 |
| 2007/0261550 A1 | 11/2007 | Ota |
| 2007/0261557 A1 | 11/2007 | Gadkaree et al. .............. 96/121 |
| 2007/0283807 A1 | 12/2007 | Whitley ............................. 95/96 |
| 2008/0003094 A1 | 1/2008 | Celik et al. |
| 2008/0051279 A1 | 2/2008 | Klett et al. ..................... 502/60 |
| 2008/0072822 A1 | 3/2008 | White ............................. 118/722 |
| 2008/0128655 A1 | 6/2008 | Garg et al. .................... 252/373 |
| 2008/0282883 A1 | 11/2008 | Rarig et al. ..................... 95/96 |
| 2008/0282884 A1 | 11/2008 | Kelley et al. .................... 95/96 |
| 2008/0282885 A1 | 11/2008 | Deckman et al. ............... 95/98 |
| 2008/0282886 A1 | 11/2008 | Reyes et al. ..................... 95/98 |
| 2008/0282887 A1 | 11/2008 | Chance et al. ................... 95/98 |
| 2008/0282892 A1 | 11/2008 | Deckman et al. ............. 96/140 |
| 2008/0289497 A1 | 11/2008 | Barclay et al. .................. 95/114 |
| 2008/0307966 A1 | 12/2008 | Stinson ........................... 95/187 |
| 2008/0314550 A1 | 12/2008 | Greco ............................... 165/4 |
| 2009/0004073 A1 | 1/2009 | Gleize et al. .................. 422/180 |
| 2009/0014902 A1 | 1/2009 | Koivunen et al. ............... 265/11 |
| 2009/0025553 A1 | 1/2009 | Keefer et al. ..................... 95/96 |
| 2009/0025555 A1 | 1/2009 | Lively et al. |
| 2009/0037550 A1 | 2/2009 | Mishra et al. ................. 708/208 |
| 2009/0071333 A1 | 3/2009 | LaBuda et al. ................... 95/96 |
| 2009/0079870 A1 | 3/2009 | Matsui .......................... 348/558 |
| 2009/0107332 A1 | 4/2009 | Wagner .......................... 95/100 |
| 2009/0151559 A1 | 6/2009 | Verma et al. .................... 95/96 |
| 2009/0162268 A1 | 6/2009 | Hufton et al. ................. 423/210 |
| 2009/0180423 A1 | 7/2009 | Kroener ......................... 370/328 |
| 2009/0241771 A1 | 10/2009 | Manning et al. ................. 95/15 |
| 2009/0284013 A1 | 11/2009 | Anand et al. .................... 290/52 |
| 2009/0294366 A1 | 12/2009 | Wright et al. |
| 2009/0308248 A1 | 12/2009 | Siskin et al. .................... 95/236 |
| 2009/0314159 A1 | 12/2009 | Haggerty ......................... 95/90 |
| 2010/0059701 A1 | 3/2010 | McLean ......................... 251/304 |
| 2010/0077920 A1 | 4/2010 | Baksh et al. ..................... 95/97 |
| 2010/0089241 A1 | 4/2010 | Stoner et al. ..................... 96/125 |
| 2010/0186445 A1 | 7/2010 | Minta et al. ..................... 62/606 |
| 2010/0212493 A1 | 8/2010 | Rasmussen et al. ............. 95/45 |
| 2010/0251887 A1 | 10/2010 | Jain .................................. 95/46 |
| 2010/0252497 A1 | 10/2010 | Ellison et al. ............. 210/500.1 |
| 2010/0263534 A1 | 10/2010 | Chuang .......................... 95/139 |
| 2010/0282593 A1 | 11/2010 | Speirs et al. .................... 203/11 |
| 2010/0288704 A1 | 11/2010 | Amsden et al. ............... 210/688 |
| 2011/0011803 A1 | 1/2011 | Koros |
| 2011/0031103 A1 | 2/2011 | Deckman et al. ............. 203/41 |
| 2011/0067440 A1 | 3/2011 | Van Aken ....................... 62/613 |
| 2011/0067770 A1 | 3/2011 | Pederson et al. ........ 137/625.15 |
| 2011/0146494 A1 | 6/2011 | Desai et al. ..................... 96/115 |
| 2011/0217218 A1 | 9/2011 | Gupta et al. ................... 423/228 |
| 2011/0277620 A1 | 11/2011 | Havran et al. ................. 89/1.14 |
| 2011/0291051 A1 | 12/2011 | Hershkowitz et al. ........ 252/373 |
| 2011/0296871 A1 | 12/2011 | Van Soest-Vercammen et al. .............................. 62/636 |
| 2011/0308524 A1 | 12/2011 | Brey et al. ............... 128/205.12 |
| 2011/0315009 A1 | 12/2011 | Ambriano et al. ............... 95/26 |
| 2012/0024152 A1 | 2/2012 | Yamawaki et al. ............... 95/96 |
| 2012/0031144 A1 | 2/2012 | Northrop et al. .............. 62/617 |
| 2012/0067216 A1 | 3/2012 | Corma-Canos et al. ......... 95/95 |
| 2012/0152115 A1 | 6/2012 | Gerds et al. ...................... 95/90 |
| 2012/0222551 A1 | 9/2012 | Deckman ......................... 95/96 |
| 2012/0222552 A1 | 9/2012 | Ravikovitch et al. ............ 95/97 |
| 2012/0222553 A1 | 9/2012 | Kamakoti et al. ............... 95/99 |
| 2012/0222554 A1 | 9/2012 | Leta et al. ...................... 95/104 |
| 2012/0222555 A1 | 9/2012 | Gupta et al. .................... 95/136 |
| 2012/0255377 A1 | 10/2012 | Kamakoti et al. ......... 73/863.23 |
| 2012/0255445 A1 | 10/2012 | Haruna et al. |
| 2012/0308456 A1 | 12/2012 | Leta et al. ..................... 423/228 |
| 2012/0312163 A1 | 12/2012 | Leta et al. ........................ 95/97 |
| 2013/0061755 A1 | 3/2013 | Frederick et al. ............. 96/110 |
| 2013/0225898 A1 | 8/2013 | Sundaram et al. ........... 585/802 |
| 2013/0327216 A1* | 12/2013 | Deckman ........... B01D 53/0473 95/96 |
| 2013/0340619 A1 | 12/2013 | Tammera ....................... 96/121 |
| 2014/0013955 A1 | 1/2014 | Tammera et al. .............. 96/115 |
| 2014/0060326 A1 | 3/2014 | Sundaram ......................... 95/96 |
| 2014/0157986 A1 | 6/2014 | Ravikovitch et al. ........... 95/96 |
| 2014/0208797 A1 | 7/2014 | Kelley et al. ................... 62/611 |
| 2014/0216249 A1* | 8/2014 | Berges ................ B01D 53/047 95/1 |
| 2014/0216254 A1 | 8/2014 | Tammera et al. .............. 95/114 |
| 2015/0013377 A1 | 1/2015 | Oelfke |
| 2015/0068397 A1 | 3/2015 | Boulet et al. |
| 2015/0196870 A1 | 7/2015 | Albright et al. |

FOREIGN PATENT DOCUMENTS

| | | |
|---|---|---|
| EP | 0257493 | 2/1988 |
| EP | 0426937 | 5/1991 |
| EP | 1018359 | 7/2000 |
| EP | 1577561 | 9/2005 |
| EP | 1674555 | 6/2006 |
| EP | 2823872 | 1/2015 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |

(56) References Cited

FOREIGN PATENT DOCUMENTS

| | | | |
|---|---|---|---|
| JP | 2000-024445 | 8/2001 | |
| JP | 2002-348651 | 12/2002 | |
| JP | 2006-016470 | 1/2006 | |
| JP | 2006-036849 | 2/2006 | |
| JP | 2008-272534 | 11/2008 | |
| WO | WO02/24309 | 3/2002 | |
| WO | WO02/073728 | 9/2002 | |
| WO | WO2005/090793 | 9/2005 | |
| WO | WO2011/139894 | 11/2011 | |
| WO | WO2012/118755 | 9/2012 | B01J 20/28 |
| WO | WO2012/118758 | 9/2012 | |

OTHER PUBLICATIONS

ExxonMobil Research and Engineering and Xebec (2008) RCPSA-Rapid Cycle Pressure Swing Adsorption—An Advanced, Low-Cost Commercialized H2 Recovery Process, *Brochure*, 2 pages.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Farooq, S. et al. (1990) "Continuous Contercurrent Flow Model for a Bulk PSA Separation Process," *AIChE J.*, v36 (2) p. 310-314.

FlowServe (2005)"Exceeding Expectations, US Navy Cuts Maintenance Costs With Flowserve GX-200 Non-Contacting Seal Retrofits," *Face-to-Face*, v17.1, 8 pgs.

Ge Oil & Gas (2007) "Dry Gas Seal Retrofit," Florene, Italy, www.ge.com/oilandgas, 4 pgs.

Hopper, B. et al. (2008) "World's First 10,000 psi Sour Gas Injection Compressor," *Proceedings of the 37$^{th}$ Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res. V.* 34, pp. 255-262.

Rameshni, Mahin (May 19, 2007) "Strategies for Sour Gas Field Developments," *Worley Parsons-Brochure*, 20 pgs.

Reyes, S. C. et al. (1997) "Frequency Modulation Methods for Diffusion and Adsorption Measurements in Porous Solids," *J. Phys. Chem. B.* v101, pp. 614-622.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Realiability in Centrifugal Compressors," *Dresser-Rand, Tech. Paper 134*, 15 pages.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

\* cited by examiner

APPARATUS AND SYSTEM HAVING A VALVE ASSEMBLY AND SWING ADSORPTION PROCESSES RELATED THERETO

CROSS REFERENCE TO RELATED APPLICATIONS

This application claims the priority benefit of U.S. patent application No. 62/029,258 filed Jul. 25, 2014 entitled APPARATUS AND SYSTEM HAVING A VALVE ASSEMBLY AND SWING ADSORPTION PROCESSES RELATED THERETO, the entirety of which is incorporated by reference herein.

FIELD

The present techniques relate to a system associated with a swing adsorption process. In particular, the system includes an adsorbent bed unit whose configuration includes a pulse flow control mechanism for conduits associated with the adsorbent bed for use in a swing adsorption process (e.g., rapid cycle pressure swing adsorption (RCPSA) process) with one or more valve assemblies.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

PSA processes may be used to separate gases of a gas mixture because different gases tend to fill the micropore of the adsorbent material to different extents. If a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. The adsorbent material is then typically purged and repressurized. Then, the adsorbent material is ready for another adsorption cycle.

TSA processes rely on the phenomenon that gases at lower temperatures are more readily adsorbed within the pore structure or free volume of an adsorbent material compared to higher temperatures. That is, when the temperature of the adsorbent material is increased, the adsorbed gas is released, or desorbed. By cyclically swinging the temperature of an adsorbent material (e.g., an adsorbent bed), TSA processes can be used to separate gases in a mixture when used with an adsorbent material that is selective for one or more of the components of a gas mixture.

In these swing adsorption processes, various adsorbent bed assemblies may be coupled together with conduits and valves to manage the flow of fluids. Orchestrating these adsorbent bed assemblies involves coordinating the cycles for each of the adsorbent bed assemblies with other adsorbent bed assemblies in the system. A complete cycle can vary from seconds to minutes as it transfers a plurality of gaseous streams through one or more of the adsorbent bed assemblies.

Despite the benefits of the swing adsorption processes, swing adsorption systems do not properly manage the fluid flow within the system. For example, typically, the gas from the previous stream has to be displaced as part of the process. As these streams may be at different pressures, the result is pulsation in the feed and product flows. Even the grouping of different adsorbent bed assemblies together with a shared manifold fails to adequately address this problem. For example, RCPSA involves rapid acting valves capable of tight sealing, and reduced dead volume. A process that involves large pressure swings (e.g., 85 to 1.2 BARA) and short cycle time (e.g., less than 60 second, less than 20 seconds, or less than 10 seconds) may have pulsation in the headers. For some flow service duties, the pulsation can interfere with the flow rate through the adsorbent bed, from end to end (where a valve is open on both ends at once) or in adjacent vessels (e.g., where the valve opening times overlap.). The pulsation can cause unwanted mechanical vibrations, which may shorten the life of various components within the system.

Accordingly, there remains a need in the industry for apparatus, methods, and systems that are more efficient and can be constructed to lessen the pulsation of fluid flow through the system. The more efficient management of the streams is beneficial when the swing adsorption processes involve the rapid cycles. Further, there is a need for an enhanced method and apparatus to implement an industrial-scale, adsorbent bed unit, which has valves that enhance the cycle time and manage the steady flow of fluids between cycles. The present techniques provide a method and apparatus that overcome one or more of the deficiencies discussed above.

SUMMARY OF THE INVENTION

In one or more embodiments, a cyclical swing adsorption process for removing contaminants from a gaseous feed stream id described. The method includes: performing a cyclical swing adsorption process by: passing a portion of a gaseous feed stream through one of a plurality of adsorbent bed units during an adsorption step, wherein the one of the plurality of adsorbent bed units is configured to separate one or more contaminants from the portion of the gaseous feed stream to form a product stream; interrupting the flow of the gaseous feed stream to the one of the plurality of adsorbent bed units; and removing one or more contaminants from the one of the plurality of adsorbent bed units during a subsequent swing adsorption process step; and repeating the cyclical swing adsorption process for a subsequent cycle; wherein each of the plurality of adsorbent bed units are in fluid communication with a plurality of manifolds, wherein one of the plurality of manifolds is in fluid communication with a pulse flow control mechanism configured to lessen pulsation within the one of the plurality of manifolds.

Further, in one or more embodiment, a cyclical swing adsorption system is described. The system may include a plurality of manifolds, wherein each manifold of the plurality of manifolds is associated with one swing adsorption process step of a plurality of swing adsorption process steps; a plurality of adsorbent bed units coupled to the plurality of manifolds, each of the adsorbent bed units comprising: a housing; an adsorbent material disposed within the housing; a plurality of valves, wherein at least one of the plurality of valves is associated with one of the plurality of manifolds and is configured to manage fluid flow along a flow path extending between the respective manifold and the adsorbent material; and a pulse flow control mechanism in fluid communication with one of the plurality of manifolds and configured to lessen pulsation within the one of the plurality of manifolds.

In one or more embodiment, the method and system may include other features. For example, the method may include separating a feed stream into the portion of the gaseous feed stream and a repressurization stream in the pulse flow control mechanism, which includes a splitter and a pulsation dampener (e.g., pulsation bottle and a choke tube), prior to passing the gaseous feed stream to a feed manifold of the plurality of manifolds and passing the repressurization stream to feed repressurization manifold. Also, the pulse flow control mechanism may include a controller configured to adjust a ramp rate of one or more of a plurality of poppet valves to reduce pressure fluctuations in the one of the plurality of manifolds, wherein each of the plurality of adsorbent bed units comprise one or more poppet valves from the plurality of poppet valves. The pulse flow control mechanism may include a pulse flow controller configured to maintain a substantially constant pressure within the one of the plurality of manifolds. Further, the pulse flow controller may be configured to operate based on a feed forward algorithm, wherein the feed forward algorithm is based on lift versus time values transmitted from a valve controller associated with one of the one or more poppet valves and/or is based on a calculation of the flow area to produce the instantaneous mass flow at each instant in time.

DETAILED DESCRIPTION OF THE INVENTION

Figure 1:
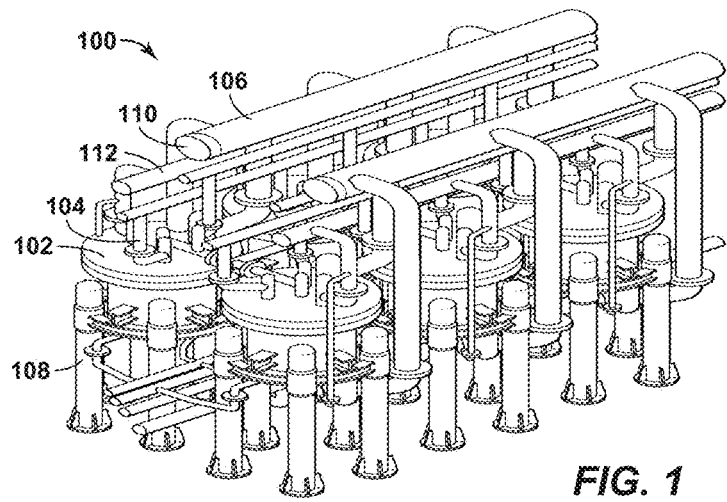
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

The present techniques relate to a mechanical configuration, which integrates multiple gaseous streams through one or more adsorbent bed assemblies. The multi-adsorbent bed configuration may be utilized for gas separation systems. Further, the swing adsorption system may include one or more adsorbent bed units, which may each have valve assemblies, which may include reciprocating valve assemblies, such as poppet valve assemblies. The present techniques can be used for any type of swing adsorption process. Non-limiting swing adsorption processes for which the present invention can be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes, such as pressure/temperature swing adsorption. Exemplary kinetic swing adsorption processes are described in U.S. Patent Application Publication Nos. 2008/0282892, 2008/0282887, 2008/0282886, 2008/0282885, and 2008/0282884 which are each herein incorporated by reference in their entirety.

Exemplary swing adsorption systems are described in United States Patent Application Publication Nos. 2011/

0291051; 2013/0327216 and 2013/0061755 along with Intl. Application Publication Nos. 2011/149640, 2012/118755 and 2012/118758, which are each incorporated by reference. In such systems, the configuration may include one or more adsorbent beds, each undergoing different steps in an adsorption cycle that may include an adsorption step, one or more depressurization/desorption steps, one or more blow-down steps, one or more purge steps and one or more re-pressurization steps. The adsorbent beds and various conduits along the flow path have to be swept or otherwise managed to flow of fluids through the system. It is the flow of these fluids that results in pulsation within the system.

Figure 5A:
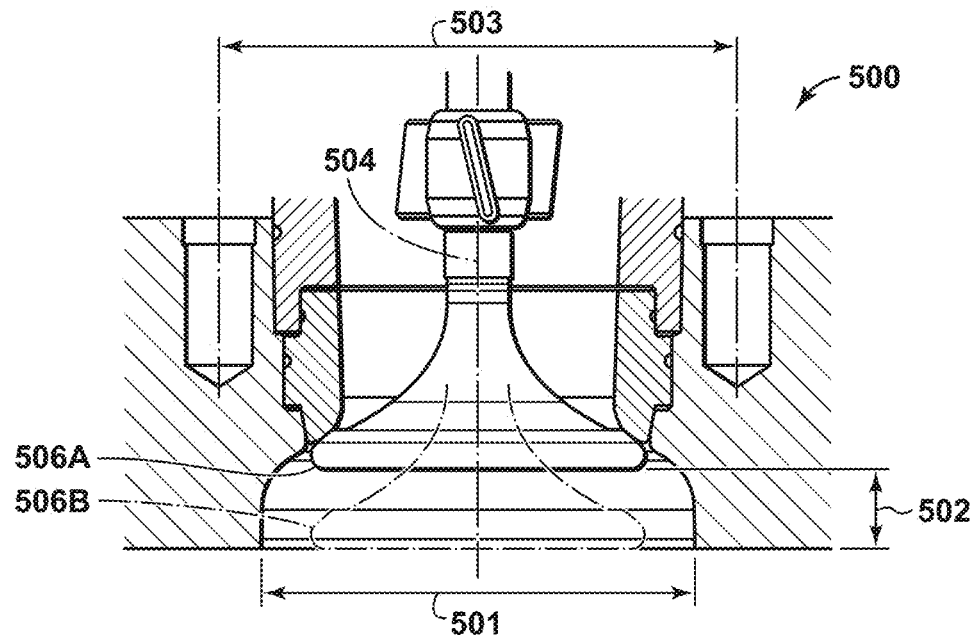
FIGS. 5A and 5B are exemplary poppet valves.
Figure 5B:
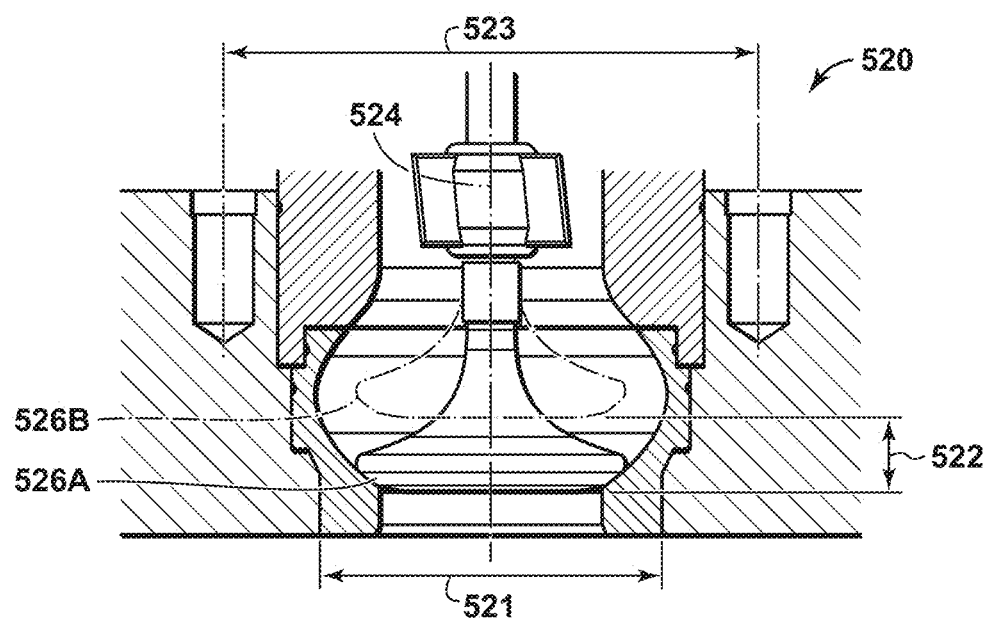

In the system, various valves may be utilized to manage the flow of fluid within the process. For example, the system may include poppet-type valves. The poppet-type valve may include poppet valve assemble that opens toward the adsorbent bed, as shown in FIG. 5A (i.e. a forward acting valve). Alternatively, the poppet-type valve assembly may be configured to operate as a "reverse acting valve", which opens away from the adsorbent bed, as shown in FIG. 5B. The type of poppet valve utilized may provide certain enhancements to the operation of the system. For example, a reverse acting valve may lessen the void space (e.g., minimum dead volume in the adsorption bed unit. Also, when used with a high pressure feed, the reverse acting valve may utilize the feed pressure to assist with the sealing force when the poppet valve is closed and the vessel is at low pressure. The forward acting valve may be utilized for other steps, when the adsorption bed is at a higher pressure than the associated conduit (e.g., a low pressure blow-down valves). Accordingly, the configuration of the poppet valves may utilize the present techniques to enhance the operation of the system, which may be beneficial for rapid swing adsorption processes (e.g., RCPSA processes). These processes may involve pressures between about 0 bar absolute (bara) or 0.1 bara and 100 bara.

The present techniques provide various enhancements to swing adsorption systems. These enhancements may be utilized to lessen the pulsation of flow of fluids through the system. That is, the opening and closing of the valves may not be problematic for slower cycle operations, but the pulsation is problematic for a rapid cycle swing adsorption processes and associated system. In particular, the present techniques may include a pulse flow control mechanism to lessen the problems with pulsation. In one embodiment, the pulse flow control mechanism may include one or more pulse flow controllers (PFCs) in fluid communication with the poppet valve assemblies of the adsorbent bed assemblies. The PFC may be based upon the sub-sonic compressible-flow equation, which may involve calculating the flow area to produce the instantaneous mass flow at each instant in time. To manage the flow, the pressure feeding the PFC is higher than the feed pressure in the feed manifold, which should be substantially constant. As an example, if the conduit is an inlet stream, the PFC valve may be disposed upstream of the inlet header feeding the adsorbent beds in the system, while for product streams, the PFC valve may be disposed downstream of the outlet from the adsorbent bed assemblies.

The present techniques may utilize poppet-type valves with hydraulic actuation or electric actuation that are controlled by a computer to adjust the timing of the opening or closing of the PFC valve. For example, as the required valve motion can be calculated a priori, a simple feed-forward control scheme may be employed with the system. However, as the PFC does not have an unlimited frequency response, control mechanisms may include adjustments to control parameters, such as gain magnitude and phase, plus a zero to match the constant lift step. These adjustments may be used to compensate for deviations. For example, the constant lift step through the feed valve may directly influence the performance of rapid swing adsorption processes, such as RCPSA processes. If the calculated lift profile has small errors, it may be corrected by a dithering control scheme to correct the gain.

Further, the present techniques may utilize a master controller or computer system to adjust the timing of the opening or closing of the valves to coordinate between different adsorbent bed assemblies to compensate for the flow through the poppet valves and the associated lift time for the poppet valves. That is, the computer system may use the global cycle time to adjust the opening or closing of valves. Also, the mass flow may be included in the operation of the valves.

In another embodiment, the pulse flow control mechanism may include a configuration where the feed header is separated into a primary feed header and a repressurization feed header. For example, the feed stream may include a repressurization feed header that provides a first portion of the feed stream to the adsorbent bed assemblies during repressurization steps and a primary feed header that provides a second portion of the feed stream to the adsorbent bed assemblies during the adsorption step.

To manage the flow of the feed stream between the primary feed header and the repressurization feed header, the system may include a pulsation dampener. The pulsation dampener may include a pulsation bottle and a choke tube. The pulsation dampener may be disposed in the flow path between the primary feed header and the repressurization feed header to suppress any resulting pressure pulsation in the upstream conduits or manifolds. The pulsation dampener may also perform as an acoustic filter.

In other configurations, a combination of these pulse flow control mechanism may be utilized. For example, the feed header may include a PFC and also include a primary feed header and a repressurization feed header. In another example, PFCs may be used on various product headers as the pulse flow control mechanism for the respective headers, while the primary feed header and the repressurization feed header may be utilized as the pulse flow control mechanism for the feed header.

Maintaining pressure at a substantially constant pressure may vary for each of the respective manifolds with each manifold having a different target pressure. That is, for a swing adsorption process, for example, as shown in Table 1, various pressures may be within a tolerance around a target pressure for that manifold.

TABLE 1

| | Pressure variation less than: | |
|---|---|---|
| Stream | preferably % | more preferably % |
| Feed RP | 8.4 | 3.5 |
| Product RP | 7.1 | 0.06 |
| Feed | 8.4 | 0.002 |
| Product | 7.1 | 0.2 |
| Purge | 6.0 | 0.05 |
| BD1P | 13.1 | 0.9 |
| BD2P | 37.2 | 7.1 |

TABLE 1-continued

| | Pressure variation less than: | |
|---|---|---|
| Stream | preferably % | more preferably % |
| BD3P | 69.3 | 10.1 |
| BD1F | 1.6 | 0.1 |
| BD2F | 5.2 | 0.6 |
| BD3F | 53.6 | 7.7 |

As shown in Table 1, a desired range of pressures is separated for each of the respective process steams. In this Table 1, Feed RP is the pressure within the feed repressurization manifold; product RP is the pressure within the product repressurization manifold; feed is the pressure within the feed manifold; product is the pressure within the product manifold; purge is the pressure within the purge manifold; BD1P is the pressure within the first depressurization manifold on the product side; BD2P is the pressure within the second depressurization manifold on the product side; BD3P is the pressure within the third depressurization manifold on the product side; BD1F is the pressure within the first depressurization manifold on the feed side; BD2F is the pressure within the second depressurization manifold on the feed side; and BD3P is the pressure within the third depressurization manifold on the feed side.

As should be appreciated, the ranges listed above are percentages of the absolute pressure ranges. In the following examples, the pressures may be maintained within the ranges noted in Table 1 above through the use of a pulse flow control mechanism on the respective streams. For example, if the pressure within the feed repressurization manifold is configured to be at a pressure of 85 bara (target repressurization feed pressure), then the pressure within the feed repressurization manifold may be maintained within the range of 77.84 bara to 92.14 bara or in the range of to 82.025 bara to 87.975 bara. If the pressure within the feed manifold is configured to be at a pressure of 85 bara (target feed pressure), then the pressure within the feed manifold may be maintained within the range of 77.84 bara to 92.14 bara or in the range of to 84.9983 bara to 85.0017 bara. If the product repressurization manifold is configured to be at a pressure of 80 bara (target product repressurization pressure), then the product repressurization manifold may be in the range of 74.32 bara to 85.68 bara or in the range of to 79.952 bara to 80.048 bara. If the pressure within the product manifold is configured to be at a pressure of 84 bara (target product pressure), then the product manifold may be maintained within the range of 78.036 bara to 89.964 bara or in the range of to 83.832 bara to 84.168 bara. If the pressure within the purge manifold is configured to be at a pressure of 85 bara (target purge pressure), then the purge manifold may be maintained within the range of 79.90 bara to 90.1 bara or in the range of to 84.9575 bara to 85.0425 bara. If the pressure within the first depressurization manifold on the product side is configured to be 54 bara (target first product depressurization pressure), then the first depressurization manifold on the product side may be maintained within the range of 46.926 bara to 61.074 bara or in the range of to 53.514 bara to 54.486 bara. If the pressure within the second depressurization manifold on the product side is configured to be 14 bara (target second product depressurization pressure), then the second depressurization manifold on the product side may be maintained within the range of 8.792 bara to 19.208 bara or in the range of to 13.006 bara to 14.994 bara. If the pressure within the third depressurization manifold on the product side is configured to be 1.2 bara (target third product depressurization pressure), then the third depressurization manifold on the product side may be maintained within the range of 0.3684 bara to 2.0316 bara or in the range of to 1.0788 bara to 1.3212 bara. If the pressure within the first depressurization manifold on the feed side is configured to be 54 bara (target first feed depressurization pressure), then the first depressurization manifold on the feed side may be maintained within the range of 53.14 bara to 54.86 bara or in the range of to 53.95 bara to 54.05 bara. If the pressure within the second depressurization manifold on the feed side is configured to be 14 bara (target second feed depressurization pressure), then the second depressurization manifold on the feed side may be maintained within the range of 13.27 bara to 14.73 bara or in the range of to 13.92 bara to 14.08 bara. If the pressure within the third depressurization manifold on the feed side is configured to be 1.2 bara (target third feed depressurization pressure), then the third depressurization manifold on the feed side may be maintained within the range of 0.56 bara to 1.84 bara or in the range of to 1.11 bara to 1.29 bara.

Beneficially, the present techniques provide enhancements to swing adsorption processes and systems. In particular, the proposed configuration involves the feed rate to each bed being at the preferred value for the adsorption dynamics. That is, the pressure is maintained constant, but the feed rate varies and preferred operation is to maintain feed rate at a preferred rate a specific times in the cycle. This aspect addresses the lift mass flow problem, which is described further below. Further, the feed rate to each of the adsorbent beds during adsorption step should be substantially constant, without pulsation effects, which disturb the flow through the adsorbent. That is, the in-rush feed rate is now isolated to the repressurization feed header and does not overlap and/or disturb the steady feed. As such, this aspect addresses the rush flow problem, which is described further below. Also, the in-rush feed rate, which produces pulsating flow, may be prevented from interfering with the primary feed flow by a pulsation bottle which acts as a low-pass filter. The present techniques may be further understood with reference to the FIGS. 1 to 15E below.

FIG. 1 is a three-dimensional diagram of the swing adsorption system 100 having six adsorbent bed units and interconnecting piping. This configuration broadly relates to adsorbent bed units that can be deployed in a symmetrical orientation as shown, or non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from gas feed streams. For example, the adsorbent bed unit 102 may include various conduits (e.g., conduit 104) for managing the flow of fluids through, to or from the adsorbent bed within the adsorbent bed unit 102. These conduits from the adsorbent bed units may be coupled to a manifold (e.g., manifold 106) to distribute the flow to, from or between components. The adsorbent bed may separate one or more contaminants from the gaseous feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 108, which are dedicated to the adsorbent bed unit and may be dedicated to one or more step in the process.

As an example, which is discussed further below in FIG. 2, the adsorbent bed unit 102 may include housing, which may include a head portion and other body portions, that forms a substantially gas impermeable partition, an adsorbent bed disposed within the housing and a plurality of poppet valves providing flow paths through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifold or header. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

In this swing adsorption system 100, the pulse flow control mechanism may include various configurations to manage the pulsation in the system. For example, the manifold 106 may include a pulse flow controller (PFC), such as PFC 110, that is disposed upstream of the adsorbent bed units, such as adsorbent bed unit 102, and is in fluid communication with the various adsorbent bed units. In this configuration, the feed stream may flow from a source location, such as a pipeline or storage tank, through the PFC 110 and to the adsorbent bed units. The PFC 110 may operate to lessen pulsation in the system for the respective streams.

In an alternative or additional configuration, the pulse flow control mechanism may include a primary feed header, such as manifold 106, and a repressurization feed header, such as manifold 112. In this configuration, a first portion of the feed stream may flow from a source location, such as a pipeline or storage tank, through a feed pulsation dampener (not shown) to the manifold 112, which is the repressurization feed header. Then, a second portion of the feed stream may flow through the manifold 106, which is primary feed header to the adsorbent bed units. The separate streams with the feed pulsation dampener may lessen pulsation in the feed header. These various configurations of the pulse flow control mechanism may be utilized to reduce the pulsation from swing adsorption processes, such as the RCPSA process.

Figure 2:
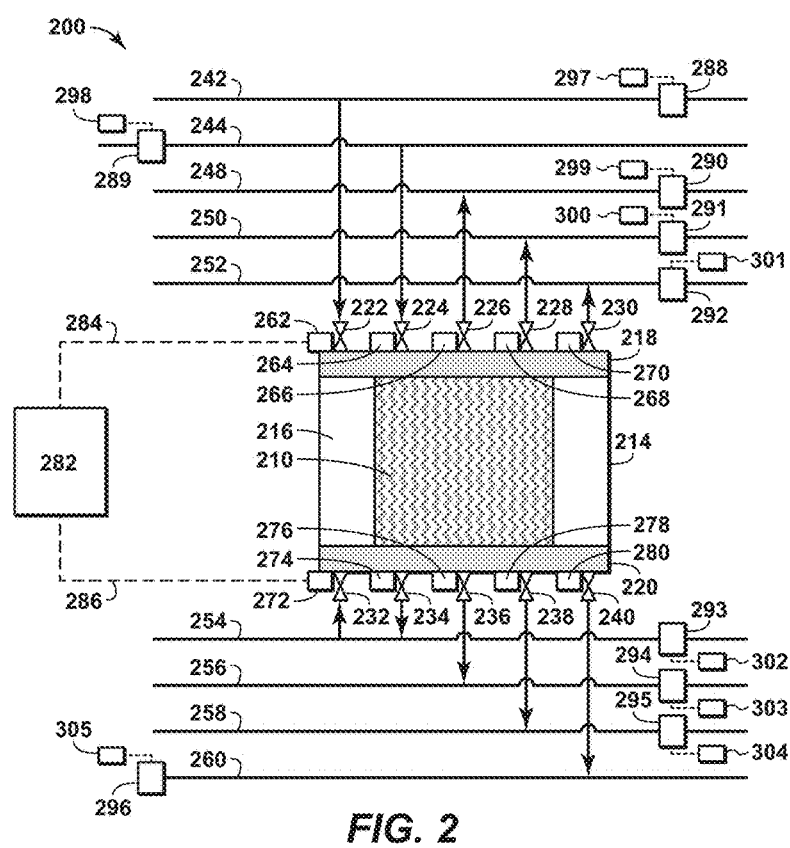
FIG. 2 is a diagram of a portion of an adsorbent bed unit having associated valve assemblies and manifolds in accordance with an embodiment of the present techniques.

FIG. 2 is a diagram 200 of a portion of an adsorbent bed unit having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps.

The upper head 218 and lower head 220 contain openings in which valve structures can be inserted, such as poppet valve assemblies 222 to 240, respectively. The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow paths through the inlet manifolds 242 and 244 and the outlet manifolds 248, 250 and 252, while the lower head 220 contains various openings (not show) to provide flow paths through the inlet manifold 254 and the outlet manifolds 256, 258 and 260. Disposed in fluid communication with the respective manifolds 242 to 260 are the poppet valve assemblies 222 to 240. The poppet valve assemblies 222 to 240 may include a disk element connected to a stem element which can be positioned within a bushing or valve guide. The stem element may be connected to an actuating means, such as actuating means 262 to 280, which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

Further, each of the inlet manifolds 242, 244 and 254 and the outlet manifolds 248, 250, 252, 256, 258 and 260 may include a pulse flow controller, such as pulse flow controllers 288 to 296. The pulse flow controllers 288 to 296 may be disposed upstream of the inlet manifolds 242, 244 and 254 and downstream of the outlet manifolds 248, 250, 252, 256, 258 and 260. In addition, pulsation bottles (not shown) may also be utilized upstream of the inlet manifolds and downstream of the outlet manifolds, which may include an acoustic filter, to suppress any resulting pressure pulsation in the conduits or manifolds.

The adsorbent bed unit 200 may also include an operation controller 282 that is utilized to manage the operation of the poppet valve assemblies 222 to 240 via the respective actuating means 262 to 280. The operation controller 282 may communicate with the actuating means 262 to 280 via communication lines. For simplicity, this diagram only includes communication lines 284 and 286, which are illustrated as dashed lines. As may be appreciated, the communication lines may include individual communication lines or a shared communication line based on different configurations, which are discussed further below.

Figure 3A:
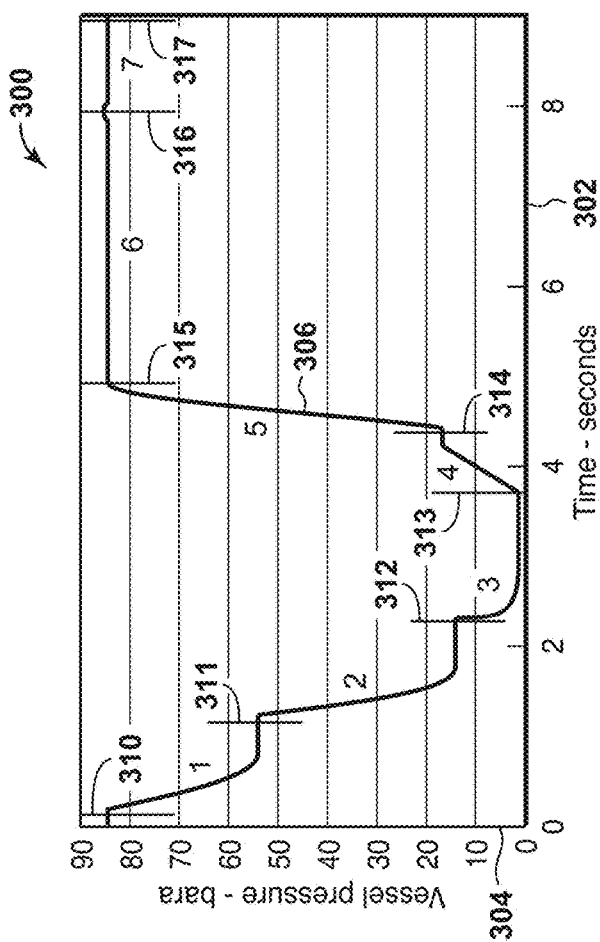
FIGS. 3A and 3B illustrate an exemplary swing adsorption process in accordance with an embodiment of the present techniques.
Figure 3B:
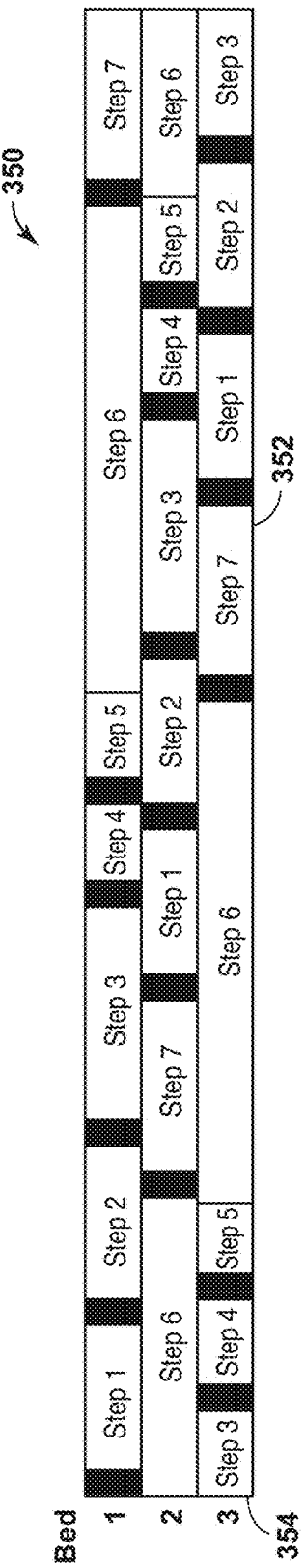

FIGS. 3A to 3B illustrate an exemplary rapid cycle swing adsorption (RCPSA) process in accordance with an embodiment of the present techniques. As an example, FIG. 3A is a graph 300 of the adsorbent bed pressures 304 versus time 302 during a complete cycle of the RCPSA process. For this example, the feed composition is 10 volume percent (vol. %) $CO_2$ with 100 parts per million (ppm) $H_2S$ with water to saturation levels. To be efficient, the RCPSA process involves rapid acting valves capable of tight sealing, and offering minimum dead volume. Accordingly, the graph 300 is explained with reference to the adsorption bed unit 200 of FIG. 2, which also cites reference numerals from FIG. 2.

In this graph 300, the various steps in the process are performed and result in a response 306 associated with the adsorption bed 210. For the response 306, the adsorbent bed undergoes various steps, which are indicated as steps 1 to 7 (represented along the response 306 by the lines 310 to 317), which include pressures in the range from 85 bara (bar absolute) to about 1 bara. In this process, step 1 is a depressurization step (represented between lines 310 and 311), step 2 is a second depressurization step (represented between lines 311 and 312), step 3 is a third depressurization step (represented between lines 312 and 313), step 4, is a product re-pressurization step (represented between lines 313 and 314), step 5 is a feed repressurization step (represented between lines 314 and 315), step 6 is an adsorption step (represented between lines 315 and 316) and step 7 is a purge step (represented between lines 316 and 317).

To perform these steps with reference to the adsorbent bed unit 200, the different poppet valve assemblies 222 to 240 have to be operated in a specific sequence to manage the flow of fluids through the adsorption bed 210. For example, in step 1, poppet valve assemblies 230 and 236 may be open to vent the adsorbent bed 210 to the manifolds 252 and 256 to a pressure of 54 Bara, while the other valves are closed. For step 2, poppet valve assemblies 228 and 238 may be open to vent the adsorbent bed 210 to the manifolds 250 and 258 to a pressure of 14 bara, while the other valves are closed. For step 3, poppet valve assemblies 226 and 240 may be open to vent the adsorbent bed 210 to the manifolds 248 and 260 to a pressure of 1.2 bara, while the other valves are closed. For step 4, poppet valve 232 may be open to repressurize the adsorbent bed 210 with product gas from manifold 254 to 18 bara, while the other valves are closed. Then, for step 5, poppet valve assembly 222 may be open to re-pressurize the adsorbent bed 210 with feed gas from the manifold 242 to a pressure of 85 bara, while the other valves are closed. The opening of the poppet valve assembly 222 provides sufficient flow into the volume of the adsorbent bed 210 to increase the pressure from the end of Step 4 to the beginning of Step 6. In this example shown in FIG. 3A, the corresponding pressures are about 17 bara to about 85 bara, respectively. For step 6, poppet valve assemblies 222 and 234 may be open for an adsorption step in the adsorbent bed 210 associated with the fluid in manifolds 242 and 254 at a pressure of 85 bara, while the other valves are closed. Finally, for step 7, poppet valve assemblies 224 and 234 may be open to purge the adsorbent bed 210 associated with the fluid in manifolds 242 and 254 at a pressure of 85 bara, while the other valves are closed.

To obtain a steady feed and product flows, multiple adsorbent bed units may be configured to operate from a shared manifold for the respective steps. As an example, FIG. 3B is an exemplary schedule 350 of the performance of an RCPSA process for three adsorbent bed units. The schedule 350 shows the step each bed is performing along in a chart that references the bed 354 versus time 352. As this example involves large pressure swings (e.g., in a range of about 85 bara to about 1.2 bara) along with a short cycle time (e.g., about 9 seconds), pulsation may occur in the manifolds or headers (the terms may be used interchangeable), such as manifolds 242 to 260. For some flow service duties, the pulsation can interfere with the required flow rate through the adsorbent matrix of the absorbent bed within an adsorption bed unit (e.g., were a valve is open on both ends at once) or in adjacent units (e.g., where the valve opening times overlap). Accordingly, the pulsations in the flow rate are described further below in FIGS. 4A to 4C.

Figure 4A:
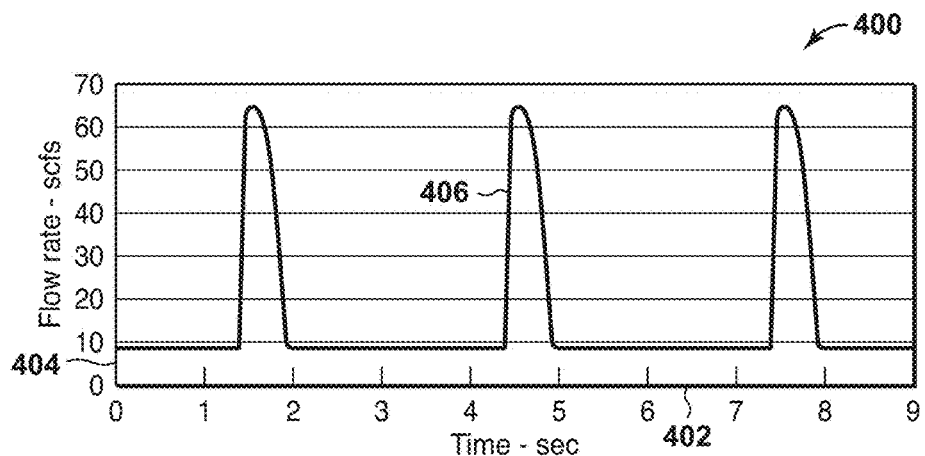
FIGS. 4A to 4C are graphs of flow rate versus time during a cycle of the RCPSA process in accordance with an embodiment of the present techniques.
Figure 4B:
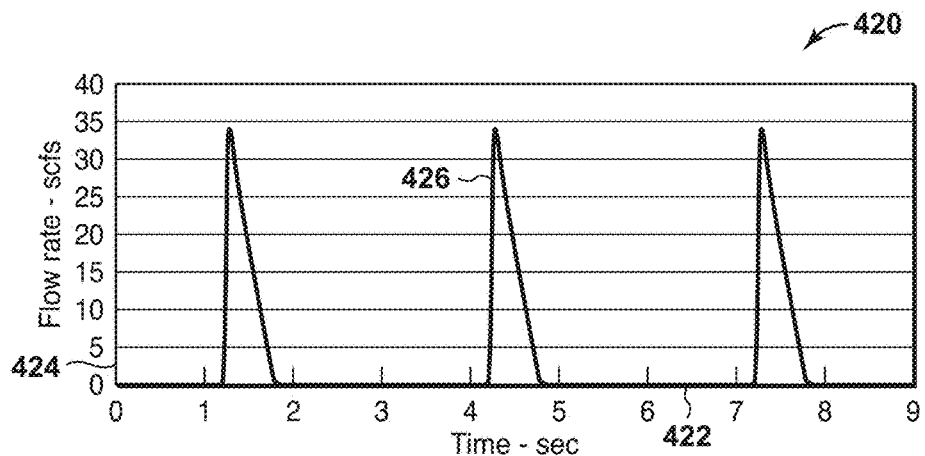
Figure 4C:
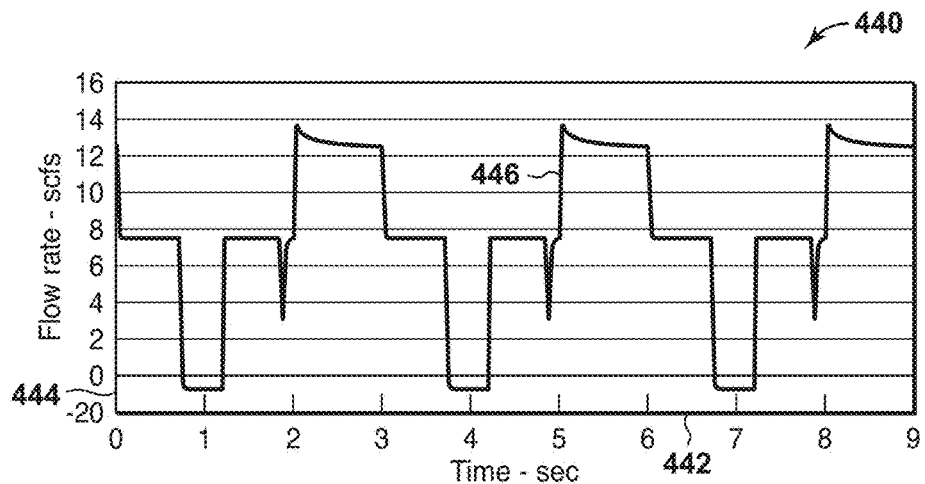

FIGS. 4A to 4C are graphs 400, 420 and 440 of flow rate versus time during a complete cycle of the RCPSA process in accordance with an embodiment of the present techniques. The graphs 400, 420 and 440 illustrate the fluctuation or pulsation of the flow rate in standard cubic feet per second (scfs) in the headers based on constant pressure headers and the operation of an RCPSA process with three adsorption bed units coupled to the manifold, as noted above in FIGS. 2, 3A and 3B. For example, the graph 400 of FIG. 4A is feed flow rate 404 versus time 402 for a feed header. The response 406 is the flow rates predicted based the operation of an RCPSA process with three adsorption bed units coupled to the manifold (e.g., manifold 242). The graph 420 of FIG. 4B is the flow rate 424 versus time 422 for a depressurization header. The response 426 is the flow rates predicted based the operation of an RCPSA process with three adsorption bed units coupled to the header (e.g., manifold 258). The graph 440 of FIG. 4C is product flow rate 444 versus time 442 for a product header. The response 446 is the flow rates predicted based the operation of an RCPSA process with three adsorption bed units coupled to the manifold (e.g., manifold 254). As shown in each of these responses 406, 426 and 446, the different peaks are associated with the valve openings for the different adsorption bed units. For example, the fluctuations in the feed header are from less than 10 scfs to more than 60 scfs, which occurs three times per 9 second per cycle. The pulsation can also cause unwanted mechanical vibrations.

In addition to pulsation from the various flow rates, the lift times of the poppet valve assemblies may also contribute to the pulsation. The lift times (e.g., the rate of valve opening) changes velocity of fluid flow within the adsorbent bed, and these changes impact the bed performance and durability. For example, valve lift times that are fast may result in rapid changes in bed velocity. That is, the lift times for the poppet valve assemblies may cause pulsations that may impact adsorbent bed operations, and bed velocity impacts the mass flow curves. With the system involving various poppet valve assemblies, the pulsation resulting from the poppet valves should also be addressed.

The pulsation associated with the lift time for the poppet valves may vary depending on the specific system and process configuration. For example, the adsorbent bed unit 102 may include different poppet valves, such as poppet valve assembles 222 to 240, associated with different fluid streams. That is, the poppet valves may include different configurations, such as positioning, direction of operation and shape, which may be adjusted for the different fluid streams. For example, the poppet valve may include a poppet valve stem, or rod, extending to a location outside its head and connected to a disk element. The valve stem can be surrounded by a bushing and/or valve guide, which provides support for the valve, while allowing movement along a linear path to guide and, in some cases, seals the valve during operation. In some embodiments, a valve stem seal is associated with the valve stem, e.g., rod packing as is typically seen in reciprocating compressors. In some instances, a valve stem seal can be the same as a bushing or valve guide, although a separate valve seal is less susceptible to wear in use. The poppet valve disk element typically has a surface facing the proximal adsorbent bed surface. The surface of the disk element can be substantially round, for seating in a substantially round opening. This surface can also be flat or profiled. That is, the poppet valve disk element may have a surface that is profiled inward or outwardly relative to the opening on which it operates. The surface of the poppet valve may be substantially parallel to the proximal adsorbent bed surface.

In certain embodiments, each valve is associated with an externally accessible valve seat that fits within its respective inlet to the adsorbent body and/or outlet from the adsorbent body and is sealed to the head by any suitable sealing means, e.g., a gasket which is held in place by the flange attaching the valve assembly to its respective inlet. Alternatively, the valve assembly can be attached to its respective inlet via a rotatable locking mechanism, e.g. a turn-to-lock or bayonet mechanism. In other embodiments, the valve seat can be installed in the head separate from the valve assembly by use of threaded-in or pressed-in seats, or by the machining of the valve seat into the head itself.

In some embodiments, the poppet valve comprises a linearly actuatable valve stem engageable with an actuator to open and close the valve by imparting linear motion thereto. The actuator is at least one of pneumatically actuated, hydraulically actuated, and electromagnetically actuated, in at least one direction. In other embodiments the actuator can be actuated by a camshaft, in at least one direction. An alternate return mechanism can be used, e.g., a spring, in certain embodiments, e.g., with a valve closing bias. An alternate actuation approach employs a common actuator on linearly aligned plural valves common to a particular fluid flow stream.

Depending on the adsorbent bed unit configuration, the poppet valve configuration may be adjusted to manage the direction the poppet valve opens for operation in the process. For example, certain poppet valves may open toward the adsorbent bed or opens away from the adsorbent bed. As an example, FIGS. 5A and 5B are exemplary poppet valves. In FIG. 5A, the poppet valve 500 is a forward acting poppet valve disposed in an opening 501, which opens a distance 502 toward adsorbent bed (not shown). To open, the stem 504 moves the disk element 506A to the position indicated by the disk element 506B away from the seat to provide a flow path through the valve. The stem 504 is able to move in an axial direction along a defined path, which may be defined by a guide element.

Alternatively, in FIG. 5B, the poppet valve 520 is a reverse acting poppet valve disposed in an opening 521, which opens a distance 522 away from the adsorbent bed (not shown). To open, the stem 524 moves the disk element 526A to the position indicated by the disk element 526B away from the seat to provide a flow path through the valve.

As may be appreciated, different configuration may be useful in operating an adsorption bed unit for certain processes. For example, the poppet valve opening toward the adsorbent bed may useful to manage the flow of fluids when the pressure is higher in the adsorbent bed as compared to the conduit or the manifold. Alternatively, the poppet valve opening away from the adsorbent bed may be preferred when the pressure is lower in the adsorbent bed as compared to the conduit or the manifold. That is, these different configurations may be useful to seal the valve. The configuration for the valve may obviate the need for separate pressure relief valves and can be useful where an adsorbent bed is susceptible to rapid pressure buildup. Further, the reverse acting poppet valve may provide less dead or void space in the adsorbent bed unit having poppet valves that open away from the adsorbent bed than those where the poppet valve opens towards the adsorbent bed. Moreover, a flow distributor may also be utilized to in certain embodiments of the adsorption bed unit to manage different flow patterns.

As an example, the poppet valve assemblies 222 to 240 of FIG. 2 may include a combination of forward acting poppet valves and reverse acting poppet valves. In particular, poppet valve assemblies 226 and 240 may be forward acting poppet valves, while poppet valve assemblies 222, 224, 228, 230, 232, 234, 236 and 238 may be reverse acting poppet valves.

Figure 6A:
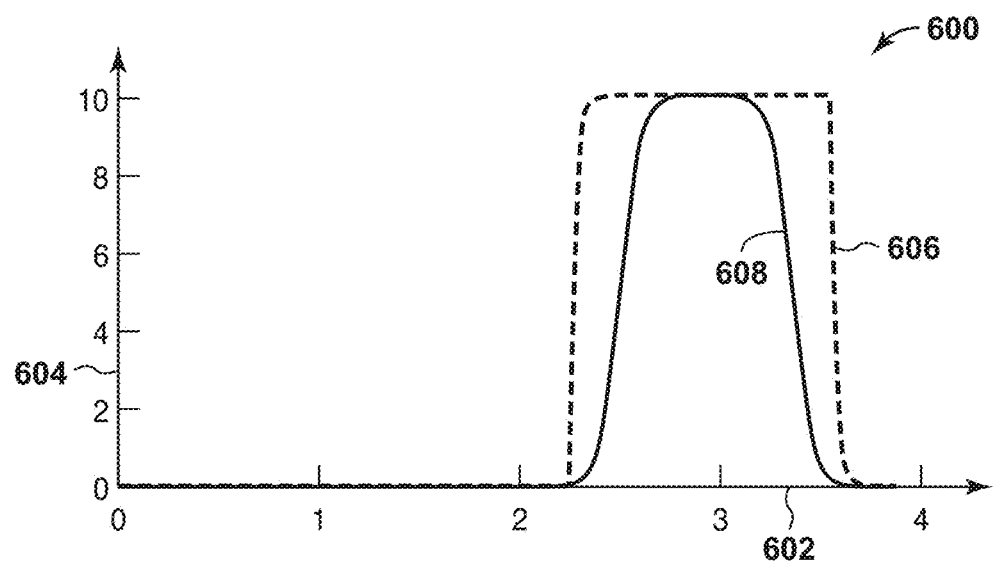
FIGS. 6A to 6B are graphs of lift, pressure and/or mass flow rate versus time during a cycle of the RCPSA process through one of the feed poppet valves.
Figure 6B:
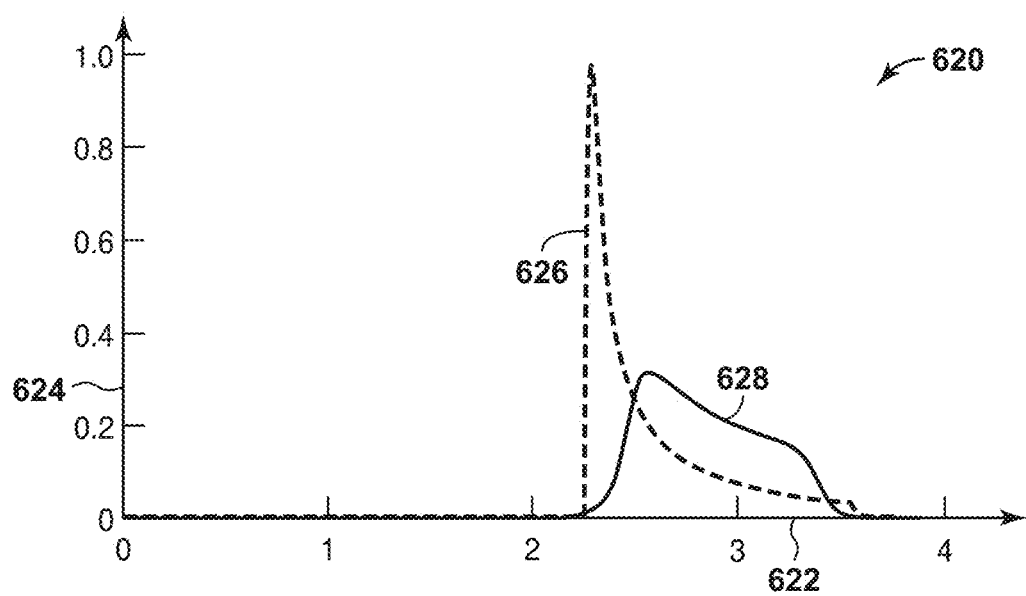

As an example, FIGS. 6A and 6B are graphs of lift and/or mass flow versus time during a cycle of the RCPSA process through one of the poppet valves in accordance with an embodiment of the present techniques. For example, FIG. 6A is a graph 600 of the poppet valve lift 604 in millimeters (mm) versus time 602 in seconds during steps in the swing adsorption process. In this graph 600, the lifting motion of the poppet valve, which may be poppet valve assembly 222 of FIG. 2, is utilized to re-pressurize of the adsorption bed (e.g., Step 5 in FIG. 3A) and the feed flow through the adsorbent bed (e.g., Step 6 in FIG. 3A). The response 606 is the arbitrary valve motion without a ramp, while the response 608 is the valve motion with opening speed (ramp) adjusted to moderate the instantaneous flow rate. In this graph 600, the response 606 (dashed line) shows two times with the poppet valve at a constant lift, which represents Steps 5 and 6, respectively. The response 606 is the valve lift used to transfer the mass of gas for Step 5. As noted in this graph 600, the response 606 involves sudden acceleration and decelerations, which is not typical for other systems, such as engine operations. As the step in the response 606 is difficult to achieve in a practical valve mechanism, the response 608 is the lift with a gradual ramp rate applied. As such, the response 608 (solid line) represents opening and closing ramps in a sigmoid form. That is, the response 608 is the opening and closing ramp velocities and accelerations.

Lessening the ramp rate may be preferred to manage the fluid flow. For example, the lift of the poppet valves may be dependent on time and poppet diameters. To calculate the ramps, equation (e1) may be utilized to calculate the ramp for the poppet valve. As shown in equation (e1), the lift (LIFT (t)) may be expressed as follows:

$$\mathrm{LIFT}(t) := \mathrm{Lift} \cdot \left[ \left[ \frac{1 + \tanh\left[v0 \cdot mp_o \cdot \left(\frac{t}{mp_o} - 1\right)\right]}{2} \cdot \frac{1 + \tanh\left[v0 \cdot mp_c \cdot \left(1 - \frac{t}{mp_c}\right)\right]}{2} \right] \right] - \mathrm{lash} \quad (e1)$$

where t is time, Maximum lift, designated as "Lift" in (e1) is proportionate to the poppet diameter; $mp_o$ is the time at midpoint of opening lift; $mp_c$ is the time at midpoint of closing lift; v0 is the ramp velocity parameter (1/sec.); tan h is the hyperbolic tangent function (dimensionless); and lash is the valve actuator dead band. As may be appreciated, the lift versus time function can be expressed in numerous other algebraic forms, which may provide the same result.

FIG. 6B is a graph 620 of the flow rate along the flow rate axis 624 in kilograms per second (kg/sec) versus time along the time axis 622 in seconds during steps in the swing adsorption process. In this graph 620, the mass flow responses 626 and 628 are associated with a poppet valve, which may be poppet valve assembly 222 of FIG. 2 and utilized in Steps 5 and 6 in FIG. 3A. The mass flow response 626 (chain-dotted line) is the instantaneous flow rate without the ramp, which represents the mass flow given by the lift motion shown by response 606 in FIG. 6A. This mass flow shows a sharp pulse in the mass flow rate and is the instantaneous flow rate with the ramp. The mass flow response 628 (solid line) represents a revised mass flow determined by the lift motion shown by the response 608 in FIG. 6A. The peak magnitude of the revised mass flow in response 628 is less than half that of the response 626 (e.g., about 30% of the peak magnitude), which provides lessening of pulsation in the feed header. The poppet lift motion required to reduce the pulsation can be obtained by manipulating the ramp rate defined by parameter v0 the equation (e1), which is noted above.

Figure 7:
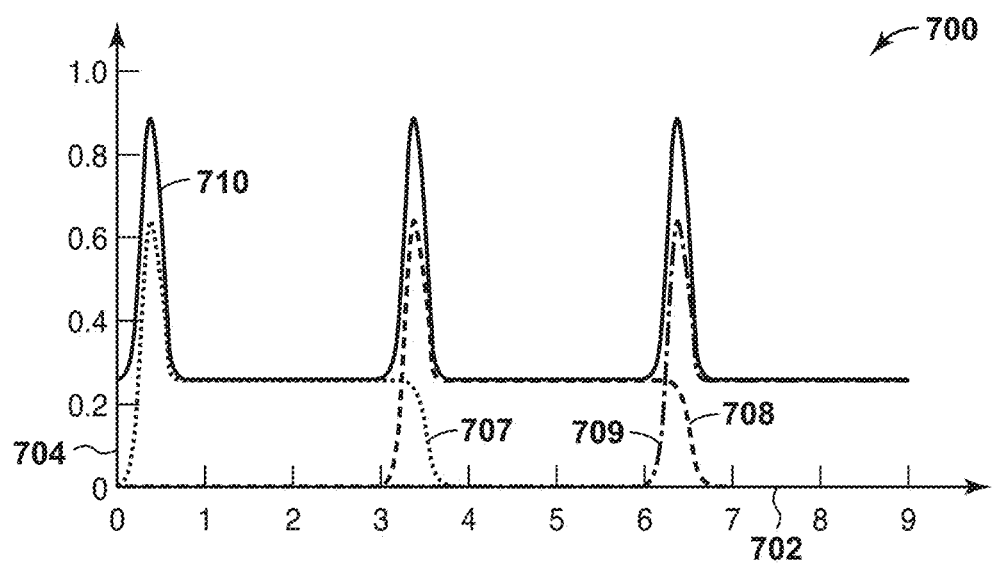
FIG. 7 is a graph of mass flow versus time during a cycle of the RCPSA process in a feed manifold.

Further, FIG. 7 is a graph mass flow versus time during a cycle of the RCPSA process in the feed manifold. In particular, FIG. 7 is a graph 700 of mass flow along a mass flow axis 704 in kilograms per second versus time along a time axis 702 in seconds during steps in the swing adsorption process. In this graph 700, the mass flow responses 707, 708, 709 and 710 are associated with a feed manifold, which may be the feed manifold 242 of FIG. 2. This graph 700 is utilized to represent the mass flow resulting from the separate opening and closing of three feed poppet valves into the three different adsorption units, such as the configuration described in FIG. 3B. The feed flows to the respective adsorption beds are represented by the responses 707 (first valve), 708 (second valve), 709 (third valve), which are the respective dashed lines. The sum of these feed flows is represented by the response 710 (solid line), which is the feed flow in the feed manifold 242 of FIG. 2. If the pressure in the feed manifold is held constant, then the same mass flow has to enter the feed manifold for each instant in time. That is, the instantaneous mass flow rate entering the manifold has to equal the sum of the instantaneous mass flows leaving the feed valves. Because two of the three poppet valves overlap in time (e.g., time between 6 and 7 seconds), the in-rush flow of an opening valve interferes with the steady flow in the adsorption bed, through the open feed valve of that adsorption bed. Steady flow is utilized to optimize the adsorption process, which is referred to as the rush flow problem. To reduce the pulsation in the feed manifold, the present techniques utilize a pulse flow control mechanism, such as the pulse flow controller (PFC) or separate feed headers. The PFC is the controller with an algorithm (e.g., feed forward algorithm) which drives the PCV.

Using the sub-sonic compressible-flow equation (e2), the flow area to produce the required instantaneous mass flow at each instant in time can be calculated, as follows:

$$CdA_{uc}(p_T, P, mdot, T, n_s, ZR) = \frac{mdot}{P} \cdot \sqrt{ZR \cdot T} \cdot \left(\frac{p_T}{P}\right)^{\frac{-1}{n_s}} \cdot \left[\left[\left(\frac{2 \cdot n_s}{n_s - 1}\right) \cdot \left[1 - \left(\frac{p_T}{P}\right)^{\frac{n_s-1}{n_s}}\right]\right]^{\frac{-1}{2}}\right] \quad (e2)$$

where $CdA_{uc}$, is the function result of the product of flow area times vena contracta; $P_T$ is the stream pressure downstream of throat (velocity energy lost); P is the stagnation pressure upstream of throat; mdot is the mass flow rate required; T is the stagnation absolute temperature upstream of throat; $n_s$ is the exponent of isentropic expansion; and ZR is the product of gas compressibility Z and gas constant R.

To reduce the pulsation, the pressure feeding the PFC has to be higher than the (constant) pressure in the feed manifold. For example, as noted above in FIG. 2, the pressure increase may be from 85 bara to 86 bara for the pulse flow control valve 288 of FIG. 2, which is upstream of a feed poppet valve 222. As such, the present techniques manage the flow area by controlling the lift of the poppet valve. The PFC valve lift versus time is described below in FIG. 8.

Figure 8:
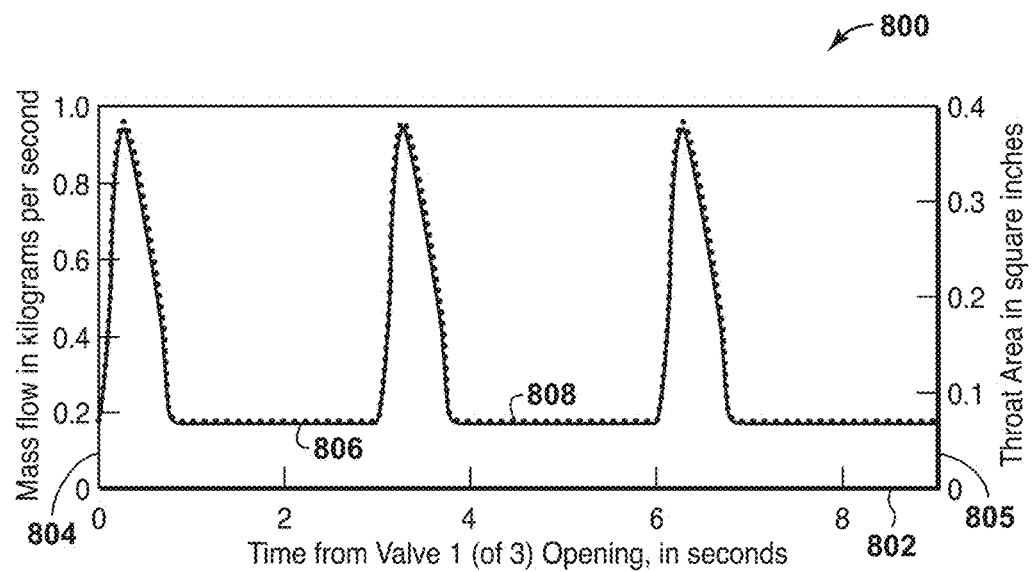
FIG. 8 is a graph of mass flow and throat area versus time during a cycle of the RCPSA process in the feed manifold with a pulse flow controller.

FIG. 8 is a graph of mass flow and throat area versus time during a cycle of the RCPSA process in the pulse flow controller. In particular, FIG. 8 is a graph 800 of mass flow along a mass flow axis 804 in kilograms per second and throat area along a throat area axis 805 in square inches versus time along a time axis 802 in seconds during steps in the swing adsorption process. In this graph 800, the mass flow response 806 and the throat area response 808 are associated with a pulse flow controller, which may be the pulse flow control valve 288 of FIG. 2. The mass flow response 806 replicates the instantaneous mass flow because they are linearly related. The instantaneous mass flow upstream of the PFC does not have the same form as shown by the mass flow response 806. To suppress any resulting pressure pulsation in the upstream lines (e.g., the manifold 242), a pulsation bottle, with an acoustic filter 297, may be utilized.

Figure 9:
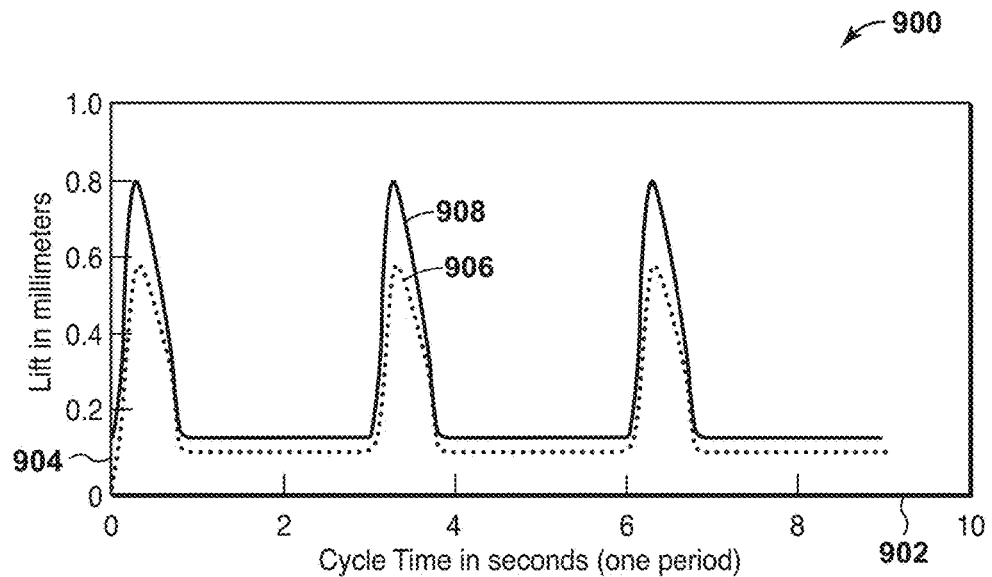
FIG. 9 is a graph of the pulse flow valve lift versus time during steps in the swing adsorption process.

FIG. 9 is a graph 900 of the pulse flow valve lift along a pulse lift axis 904 in millimeters (mm) versus time along a time axis 902 in seconds during steps in the swing adsorption process. In this graph 900, the lifting motion of the pulse flow valve, which may be pulse flow valve 288 of FIG. 2, is utilized to lessen the pulsation from the different adsorption beds. The response 908 (solid line) shows the response for the PFC. The response 906 (dashed line) represents response for a 5 Hertz low-pass response, which deviates significantly from the required response 908. The valve motion can be calculated a priori. This provides a mechanism to provide a feed-forward control scheme to be employed for the process. However, the PFC does not have an unlimited frequency response.

Figure 10:
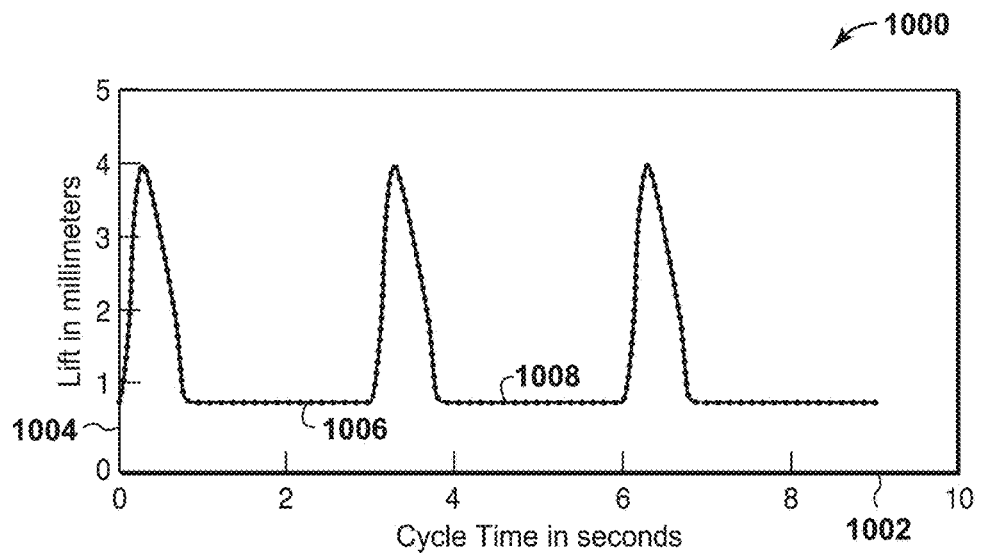
FIG. 10 is another graph of the pulse flow valve lift versus time during steps in the swing adsorption process with a pulse flow controller.

For example, spectrum of lift versus time of the PFC valve and simulate deviation from a sluggish controller with a 5 Hz low pass filter. FIG. 10 is a graph 1000 of the pulse flow valve lift 1004 in millimeters (mm) versus time 1002 in seconds during steps in the swing adsorption process. In this graph 1000, the deviation noted in the responses 906 and 908 of FIG. 9 can be adjusted by fixed factors for gain magnitude and phase, plus a constant to match the constant lift portion of the curve 1008. The constant lift portion is a primary factor in the performance of the RCPSA. If the calculated lift profile has small errors, the errors can be corrected by a dithering control scheme to correct the gain. The responses 1006 (dashed line) and 1008 (solid line) represents the response from a PFC and the calculated response with a 5 Hertz low-pass filter that has been adjusted for gain magnitude and phase with a zero to match the constant lift step. In this graph 1000, magnitude gain is about 1.38, the constant is 10 micron, phase is 40 milliseconds, giving a mean error of 1.02 micron over the time shown.

Figure 11:
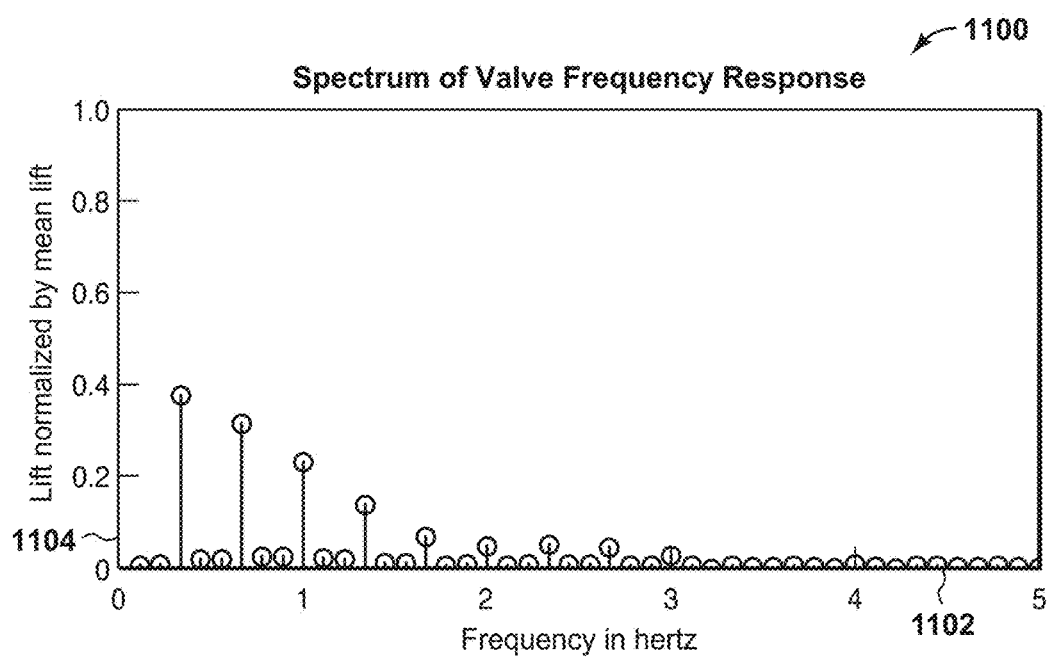
FIG. 11 is a graph of the spectrum of valve frequency response having lift normalized by mean lift versus frequency during steps in the swing adsorption process.

FIG. 11 is a graph 1100 of the spectrum of valve frequency response having lift normalized by mean lift 1104 versus frequency 1002 in Hertz (Hz) during steps in the swing adsorption process. In this graph 1100, the frequency spectrum of the low-pass PFC motion is represented. As shown in this graph, the controller operates properly because it does not involve excessive demands for frequency response. For instance, at 3 Hz, the lift is close to zero, which indicates a modest control requirement.

Figure 12:
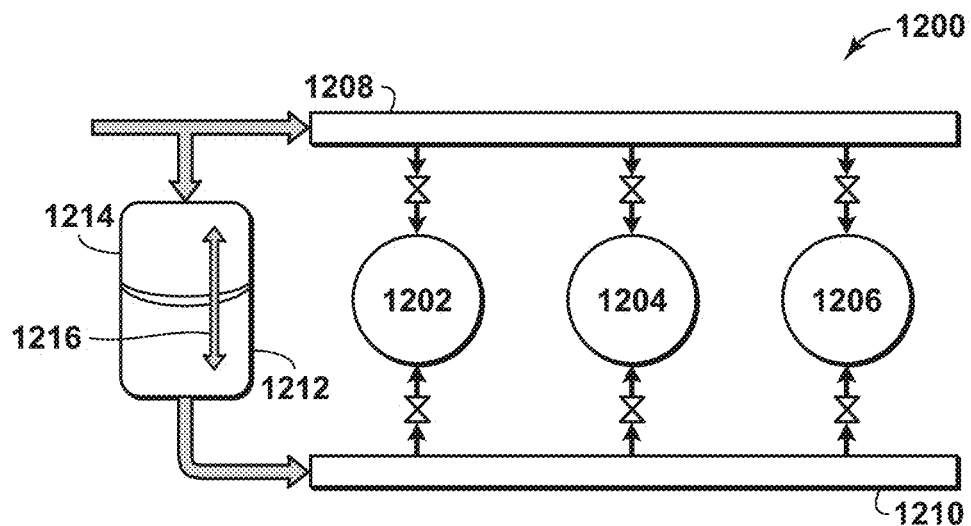
FIG. 12 is a diagram of the three adsorbent bed configurations for a swing adsorption process with a dual feed configuration.

FIG. 12 is a diagram 1200 of a three adsorbent bed configuration for a swing adsorption process with a dual feed configuration. The diagram 1200 includes a few of the components used in a system for an exemplary RCPSA process. The diagram 1200 includes three adsorbent bed units 1202, 1204 and 1206 along with a primary feed header 1208, a repressurization feed header 1210, and a pulsation dampener 1212. The pulsation dampener 1212 includes a pulsation bottle 1214 and a choke tube 1216. Each of the adsorbent bed units 1202, 1204 and 1206 may include various components, such as those noted above in FIG. 2.

For the feed stream, this proposed configuration addresses the rush flow problem and the lift mass flow problem. That is, the configuration includes a separate repressurization feed header 1210 that provides a first portion of the feed stream through a first set of valves to the respective adsorbent bed units 1202, 1204 and 1206 at more variable pressure, as compared with the primary feed header and a primary feed header 1208 that provides a second portion of the feed stream through a second set of valves to the respective adsorbent bed units 1202, 1204 and 1206 at a substantially constant pressure. The primary feed header 1208 is isolated from the repressurization feed header 1210 by a pulsation bottle 1214 with a choke tube 1216 to prevent the pressure pulses in the repressurization feed header 1210 from disturbing the primary feed header 1208. Such pulsation bottles are known to those skilled in the art for reciprocating compressors. See American Petroleum Institute Standards, API 618, 5th Edition.

Figure 13A:
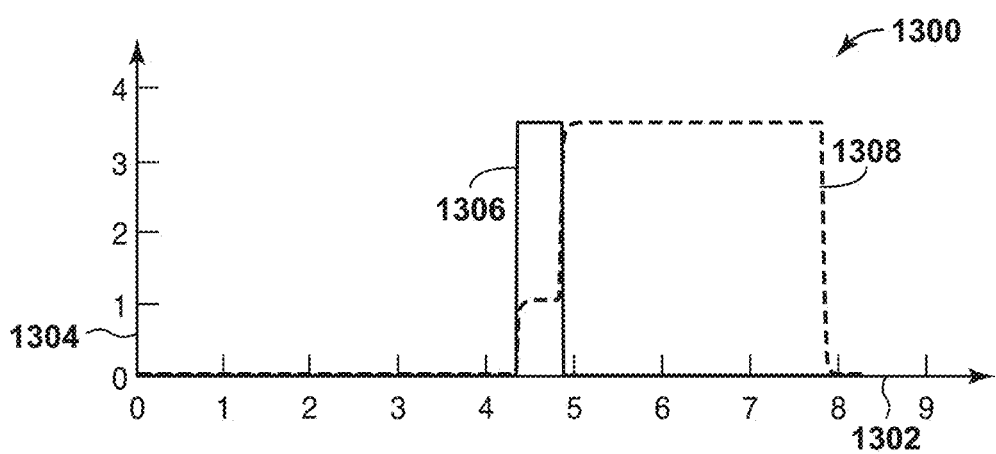
FIGS. 13A to 13F are graphs of lift and mass flow rate versus time during a cycle of the RCPSA process through one of the poppet valves for the dual feed configuration.

FIGS. 13A to 13F are graphs of lift and/or mass flow rate versus time during a cycle of the RCPSA process through one of the poppet valves for the dual feed configuration. For example, FIG. 13A is a graph 1300 of the lift in mm along a lift axis 1304 versus time along a time axis 1302 in seconds for a valve in the configuration of FIG. 12, which is associated with the feed to one of the adsorbent bed units 1202, 1204 and 1206 on the repressurization feed header 1210. In this diagram 1300, the lift response 1306 of the valve is superimposed on the lift response 1308, which is the lift predicted from the process model. The valve is in the open state only during the in-rush period, which for the current example starts at 4.3 seconds and ends at 4.9 seconds.

Figure 13B:
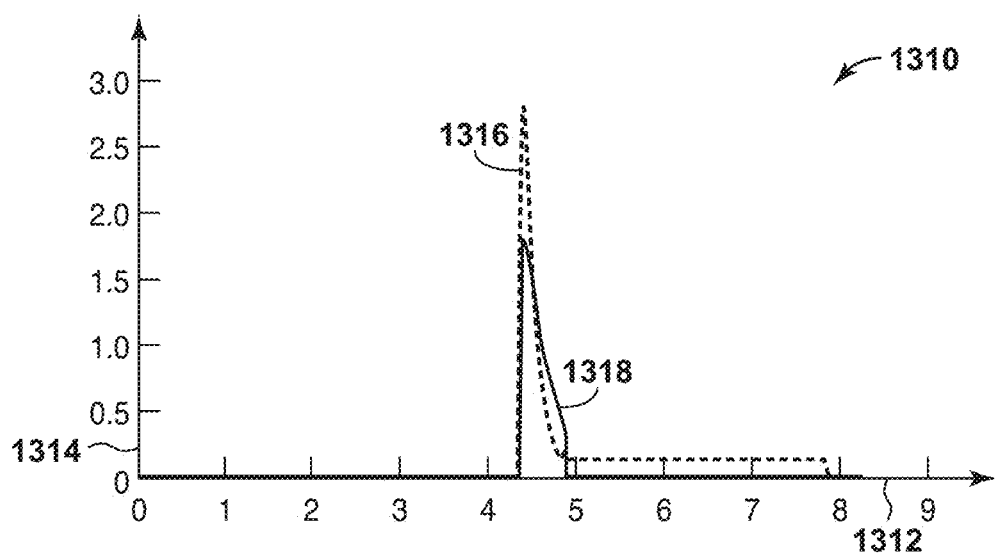

FIG. 13B is a graph 1310 of the mass flow rate along a mass rate axis 1314 verses time along a time axis 1312 for a valve in the configuration of FIG. 13A. In this diagram 1310, the flow rate response 1318 of the valve is superimposed on the flow rate response 1316 of the process model. This graph 1310 also shows the mass flow rate caused by applying the upstream and downstream pressure from the process model to the valve design, which is made to flow the same mass during the in-rush period as the process model. That is, the area under both responses 1316 and 1318 is equal during the in-rush period. In this graph 1310, the valve is closed during the period from 4.9 seconds to 8 seconds (which is the "steady flow period") for the current example.

Figure 13C:
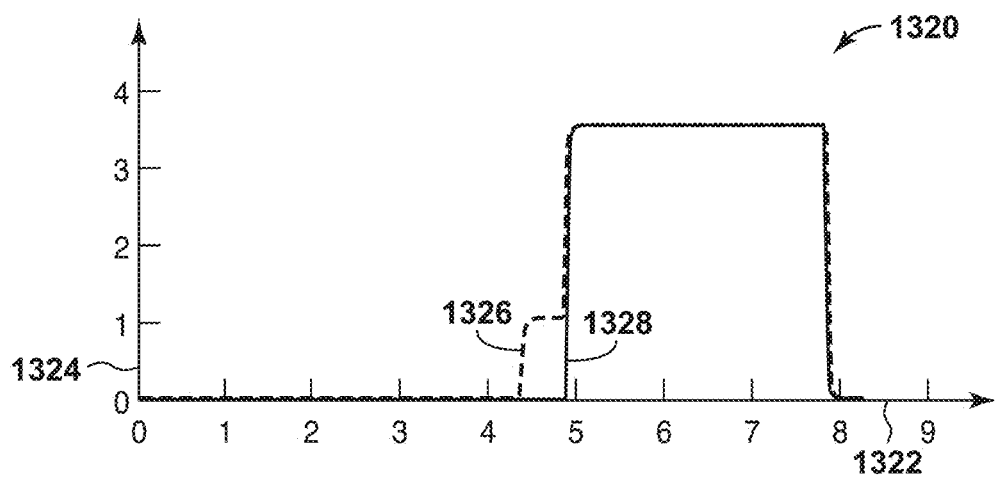

FIG. 13C is a graph 1320 of the lift in mm along a lift axis 1324 versus time along a time axis 1322 in seconds for a valve in the configuration of FIG. 12, which is associated with the feed to one of the adsorbent bed units 1202, 1204 and 1206 on the primary feed header 1208. In this diagram 1320, the lift response 1328 of the valve is superimposed on the lift response 1326, which is the lift required of a single feed valve to provide the mass flow into one vessel, as predicted from the process model. In this graph 1320, the valve opens as the previous valve of FIG. 13A is closing.

Figure 13D:
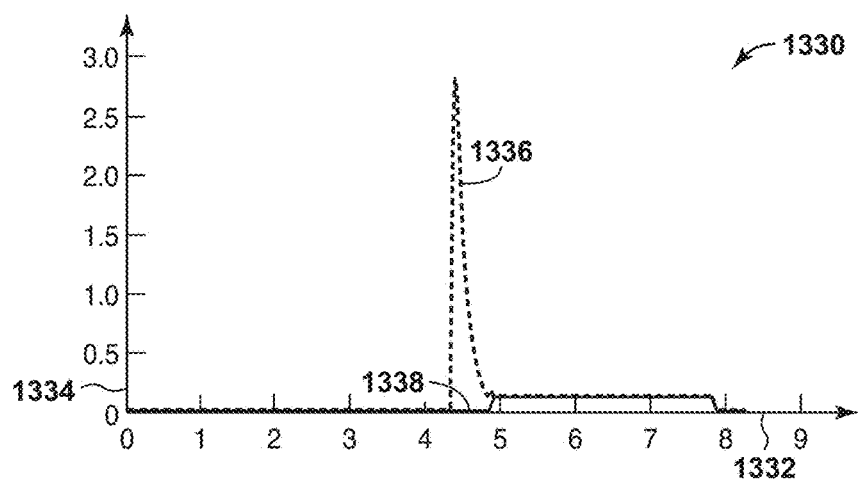

FIG. 13D is a graph 1330 of the mass flow rate along a mass rate axis 1334 verses time along a time axis 1332 for a valve in the configuration of FIG. 13C. In this diagram 1330, the flow rate response 1338 of the valve is superimposed on the flow rate response 1336 of the process model. The mass flow rate is equal to the mass flow rate throughout the steady flow period (e.g., during the period from 4.9 seconds to 8 seconds for this example), thus satisfying the process flow requirement.

Figure 13E:
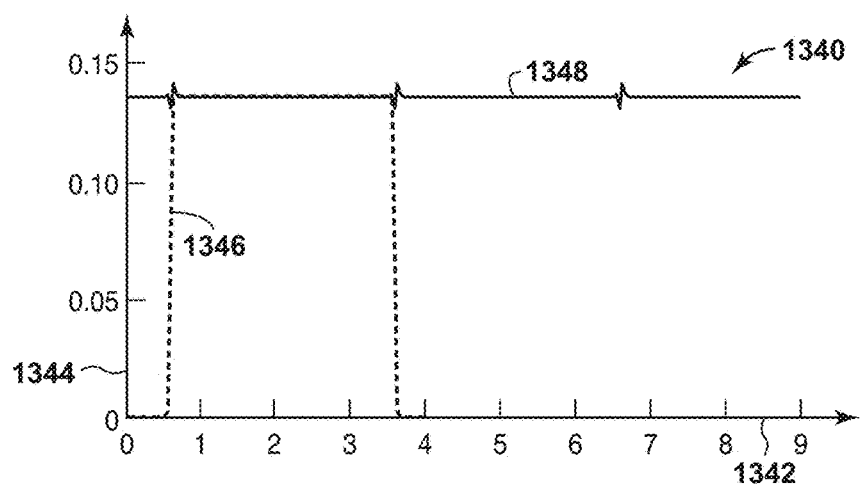

FIG. 13E is a graph 1340 of the mass flow rate along a mass rate axis 1344 verses time along a time axis 1342 for the primary feed header 1208 of FIG. 12. In this diagram 1340, the mass flow response 1348 is the mass flow rate into the primary feed header 1208 for all three adsorption bed units of the current example, while the mass flow response 1346 is for a single valve to one of the adsorbent bed units 1202, 1204 and 1206 on the primary feed header 1208. The mass flow response 1348 has substantially constant mass flow rate throughout the entire nine second cycle, except for a slight perturbation where the individual valves overlap (e.g., approximately at 0.9 second, approximately at 3.9 second and approximately at 6.9 second).

Figure 13F:
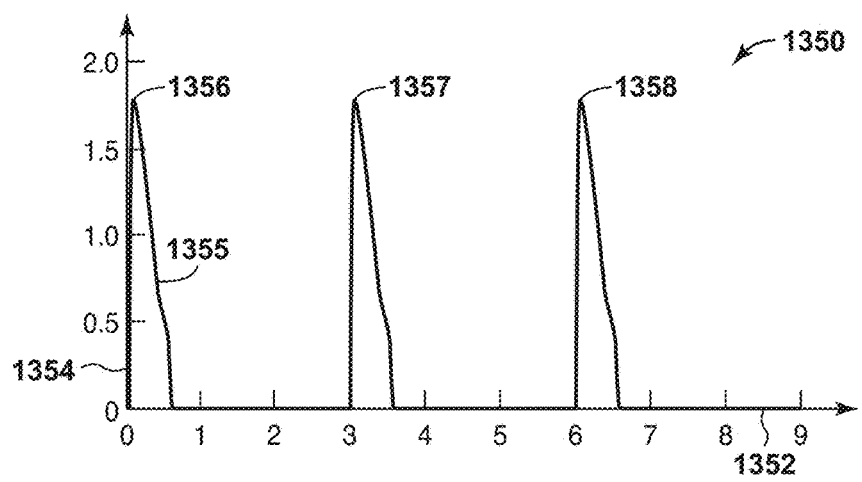

FIG. 13F is a graph 1350 of the mass flow rate along a mass rate axis 1354 verses time along a time axis 1352 for the repressurization feed header 1210 of FIG. 12. In this diagram 1350, the mass flow response 1355 is the mass flow rate into the repressurization feed header 1210 for all three adsorption bed units of the current example. This mass flow response 1355 has various peaks, such as peaks 1356, 1357 and 1358, which are associated with opening of the individual valves during the cycle. The flow rate varies strongly in time, being completely stopped for the majority of the time, with the pulsation from the in-rush) occurring in less than one second per valve for the current example.

This proposed configuration provides various enhancements to the swing adsorption process and system. For example, the feed rate to each adsorption bed units, such as adsorbent bed units 1202, 1204 and 1206, is provided at the preferred value for the adsorption dynamics. Accordingly, this adjustment addresses the lift mass flow problem. Further, the feed rate to each of the adsorbent bed units, such as adsorbent bed units 1202, 1204 and 1206, during Step 6 of FIG. 3, the primary flow-through period is virtually constant, without pulsation effects, which disturb the flow through the adsorbent bed. Further, the feed rate in the repressurization feed header 1210 is isolated from the primary feed header 1208 via the pulsation dampener 1212, and does not overlap or disturb the flow in the primary feed header 1208.

To further explain the PFC, it may be useful to describe the algorithm for PFC. As an example, the PFC may be one of the valves used for a twelve adsorption bed system, wherein the PFC is a sub-sonic valve associated with the feed manifold, which may be referred to as a pulse flow control valve (PCV). As may be appreciated, the PFC may be utilized on other manifolds as noted above.

To determine the configuration of the PFC for a stream (e.g., the feed forward algorithm), various steps may be performed, as noted below. It should be appreciated that this example is for the valves associated with the feed stream, and other valves for the other streams may involve different formulations. To begin, various inputs are determined. In a first step (i) from feed composition and state, the isentropic exponent, $n_s$, for gas expansion is calculated. As shown in equations (e7) and (e8), the method:

$$x = \frac{po - pt}{po}, \text{ for } 0.01 < x < 0.5; \tag{e7}$$

$$\Phi = \sqrt{\frac{n_s}{n_s - 1} \cdot \left(\left(\frac{pt}{po}\right)^{\frac{2}{n_s}} - \left(\frac{pt}{po}\right)^{\frac{n_s+1}{n_s}}\right) \cdot \frac{1}{1 - \frac{pt}{po}}} \tag{e8}$$

where x is ratio of the pressure difference to the upstream stagnation pressure, po is the upstream stagnation pressure, pt is stream pressure at the throat and $n_s$ is isentropic exponent for gas expansion.

Then, in step (ii) a constant may be calculated. For example, the calculation may include determining C1, where c1=slope((x, Φ)), which may be −0.636. Also, in a step (iii) the coefficient of discharge of a poppet valve, Cd, is entered. This coefficient may be a function of the valve lift, if it varies substantially over the stroke. In this example, Cd represents the vena contracta area of the flow. Next, the mean supply pressure into the PCV, $P_{inlet}$ and the mean manifold pressure at the outlet of the PCV, $P_{outlet}$, which goes to the manifold of the feed valves may be determined in step (iv). In addition, a time base in the main poppet valve controller may be defined. This may start at t=0, at the instant the feed valve opens on the first of the twelve beds. The time base may be defined to extend to the end of the cycle of all beds (for example, 9 seconds for certain rapid swing adsorption processes). Then, the time base may be divided into 1024 "bins" or other suitable number of time steps.

For each bed, the pressure at the exit of the feed valve into the vessel, pexit ((t)) as a function of the time base, is measured and each pressure is stored into its respective time step of the 1024 bins. Then, a running average is calculated for each of the 1024 bins for as long as the feed pressures remain suitably constant (e.g., within a tolerance), for 20 cycles or more. This 20-cycle time period may be referred to as the "synchronous averaging". By using this synchronous averaging, random variations in the measurement may be lessened. This measurement is performed for each bed that is being supplied the feed stream and the measurements of all the beds are not combined at this point.

From the master poppet controller of the feed valve for one bed, the poppet valve lift, LIFT(τ), of a single feed valve as a function of the 1024 bins is stored onto the same time base. Then, the vena contracta area of the valve CdA(τ) (which may be referred to as the "curtain area multiplied by the $C_D$) as a function of time for the diameter of a single poppet, $Dia_{single}$, is calculated. The calculation may involve computing the equation (e9) as follows:

$$CdA(\tau) = C_D \pi_{LIFT}(\tau) Dia_{single} \tag{e9}$$

where tau, τ, represents a step in the time base, measured in seconds from t=0.

Following this calculation, the required area of $CdA_{PCV1}$ of one PCV to pass the flow needed to balance the inflow into a manifold with the flow leaving the manifold at the same instant by way of the manifold poppets into the adsorption bed may be calculated. For example, this may be calculated for all 1024 bins (e.g., time steps) of a single bed via equation (e10):

$$CdA_{PCV1}(t) = CdA_{single}(t) \cdot \tag{e10a}$$

$$\frac{P_{outlet} + P_{outlet} \cdot c1 - c1 \cdot pexit(t)}{P_{outlet} \cdot P_{inlet} \cdot c1 - P_{outlet} \cdot c1} \cdot \sqrt{\frac{P_{outlet}^2 - P_{outlet} \cdot pexit(t)}{P_{inlet}^2 - P_{inlet} \cdot P_{outlet}}}$$

where $P_{outlet}$ refers to the outlet pressure of the PCV and $P_{inlet}$ refers to the pressure at the inlet of the PCV, and where umming over all single poppet valves gives:

$$CdA_{PCV\_Total}(t) = CdA_{PCV1}(t) CdA_{pcv2}(t)+ \tag{e10b}$$

where $CdA_{PCV\_Total}$ is the sum of the different PCV over ((t)) time. As may be appreciated, the vena contracta area of the valve $CdA_{PCV1}(t)$ may be expressed as a function using fine time steps for the $p_{exit}(t)$ and $CdA_{single}(t)$, the parameters Poutlet and Pinlet, and the gas constant c1.

Finally, following the time base for each bed in sequence, add each of the $CdA_{PCV1}$ areas for each bin to determine the required area of the single PCV feeding the feed manifold of all beds for the complete adsorption cycle (e.g., 9 second). As a result of this method, the flow into the manifold through the PCV is equal and opposite to flow out of the manifold for all the feed valves combined.

Figure 14:
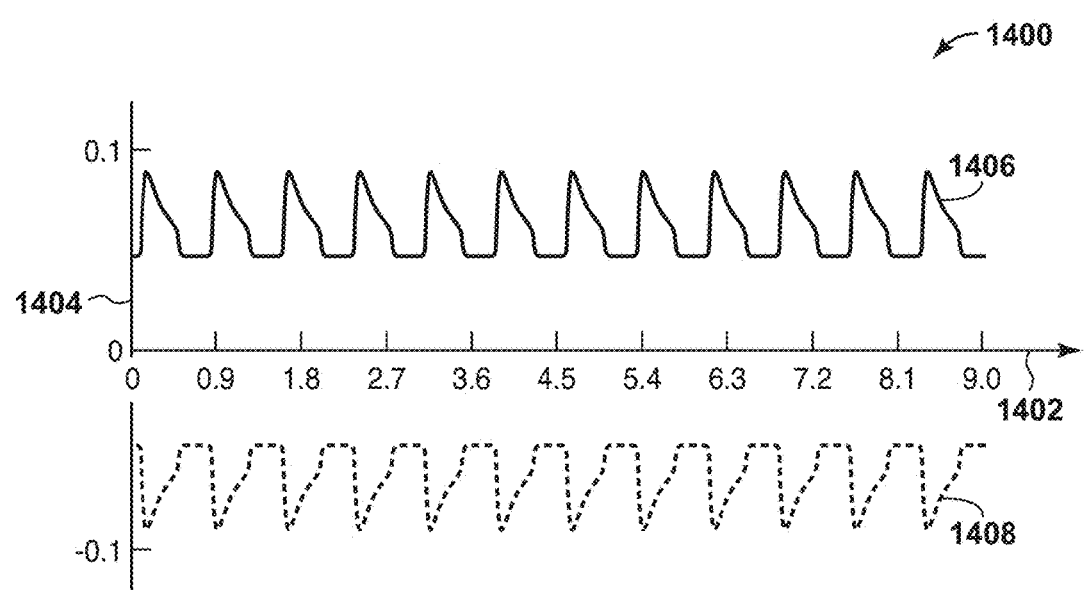
FIG. 14 is a graph of CdA versus time during an adsorption cycle of the RCPSA process through one of the poppet valves in a twelve adsorbent bed configuration.

An example of this is shown further in FIG. 14. In FIG. 14, a complete adsorption cycle of twelve beds over one complete adsorption cycle (e.g., 9 seconds) is shown. The graph 1400 of the CdA along a CdA axis 1404 verses time along a time axis 1402 for a manifold. In this diagram 1400, the response 1406 represents the total vena contracta area of the PCV, $CdA_{Total}$, over ((t)) time, calculated by the controller of the PCV acting twelve times (e.g., for twelve adsorption beds) to provide a compensating inflow into the manifold. That calculation depends only on the poppet valve lift versus time, as known by the master controller, and on the measured pressures versus time. The response 1408 is the ideal equivalent vena contracta areas (in square meters) to provide the mass outflow of all poppet valves acting in sequence over the complete adsorption cycle (e.g., 9 second). It is not known to the PVC controller, but is calculated here for comparison. As shown, the two responses 1406 and 1408 are the substantially mirror images of each other as reflected across time axis 1402. That is, the response 1408 is the predicted response to correct action of the PCV controller.

Beneficially, the pressure in the manifold remains constant because the areas (e.g., from the respective response to the time axis) result in the mass flow into the manifold at each time step to be the same as the mass flow out of the manifold for the same time step.

Accordingly, the required lift of the pressure control valve (PCV) is found using the following equation (e11), as follows:

$$Lift_{PCV}(t) = \frac{CdA_{Total}(t)}{C_D \cdot \pi \cdot Dia_{PCV}} \tag{e11}$$

This equation gives the required output, which is valve lift, of the PCV poppet. It is directly proportional to the instantaneous vena contracta area 1406, as shown in FIG. 14.

To further enhance the suppression of pulsation in the manifold, the PFC may be programmed to dither gain and phase of its output lift against the objective of minimizing any residual pulsation in the manifold.

As a further example of the configurations that utilize one or more PFCs, FIGS. 15A to 15E are diagrams of a three adsorbent bed configuration for a swing adsorption process with a PFC associated with different manifolds. These adsorption bed units may be similar to the adsorption beds described above in FIGS. 1 and 2. Also, as may be appreciated, each of these configurations may be used separately (e.g., the PFC may be associated with one manifold and the other manifolds may utilize conventional flow equipment) or in a combination of one or more of the configuration (e.g., one or more PFCs may be associated with respective manifolds and the other remaining manifolds, if any, may utilize conventional flow equipment). As may be appreciated, the number of adsorption beds in the configuration may vary and the three adsorption bed configuration is merely for exemplary purposes.

Figure 15A:
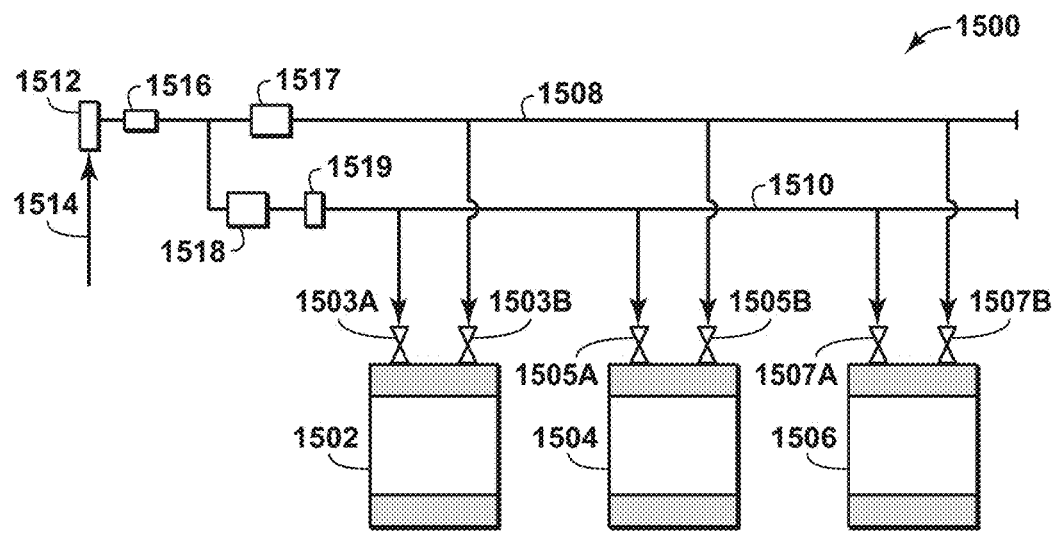
FIGS. 15A to 15E are diagrams of the three adsorbent bed configuration for a swing adsorption process with a PFC associated with different manifolds.

FIG. 15A is a diagram 1500 of a three adsorbent bed configuration for a swing adsorption process having adsorbent beds 1502, 1504 and 1506, PFC 1519 and interconnecting piping for primary feed header 1508 and a repressurization feed header 1510 in accordance with an embodiment of the present techniques. The diagram 1500 includes a few of the components used in a system for an exemplary RCPSA process. The diagram 1500 includes steps 5 (feed repressurization step) and 6 (feed step) shown in graph 300 in FIG. 3A. The diagram 1500 includes three adsorbent bed units 1502, 1504 and 1506 along with a primary feed header 1508, a repressurization feed header 1510 that is a stream from the primary feed header 1508, which may be maintained at a feed pressure (e.g., about 85 bara). The primary feed header 1508 may be fed from a feed filter 1512, which is supplied from a feed source 1514. In addition, the adsorbent bed units 1502, 1504 and 1506 may include one or more valves, such as poppet valves 1503A, 1503B, 1505A, 1505B, 1507A and 1507B, which are associated with the respective adsorbent bed units 1502, 1504 and 1506.

To manage the flow fluids through the primary feed header 1508 or a repressurization feed header 1510, various components may be installed along these headers. For example, a flow meter 1516 may be disposed in fluid communication with the primary feed header 1508 at a location upstream of the split between the primary feed header 1508 and a repressurization feed header 1510. The flow meter 1516 may be used to measure the feed flow rate into the adsorbent beds. Also, a pulsation dampener 1518 may be disposed along the flow path of the repressurization feed header 1510. The pulsation dampener 1518 may include a pulsation bottle and a choke tube.

Further, the primary feed header 1508, which has a steady flow of the stream (e.g., gas) through it may include a conventional pressure controller 1517, to set the pressure of the feed header at 85 bara, disposed upstream of the adsorbent bed units 1502, 1504 and 1506. A conventional pressure controller can be used in the feed header 1508 as the pressure and flow are almost constant in this header. The repressurization feed header 1510 may include a repressurization PFC 1519 disposed upstream of the adsorbent bed units 1502, 1504 and 1506 and downstream of the pulsation dampener 1518. This PFC reduces pressure pulsation in the re-pressurization header downstream of the PFC.

Figure 15B:
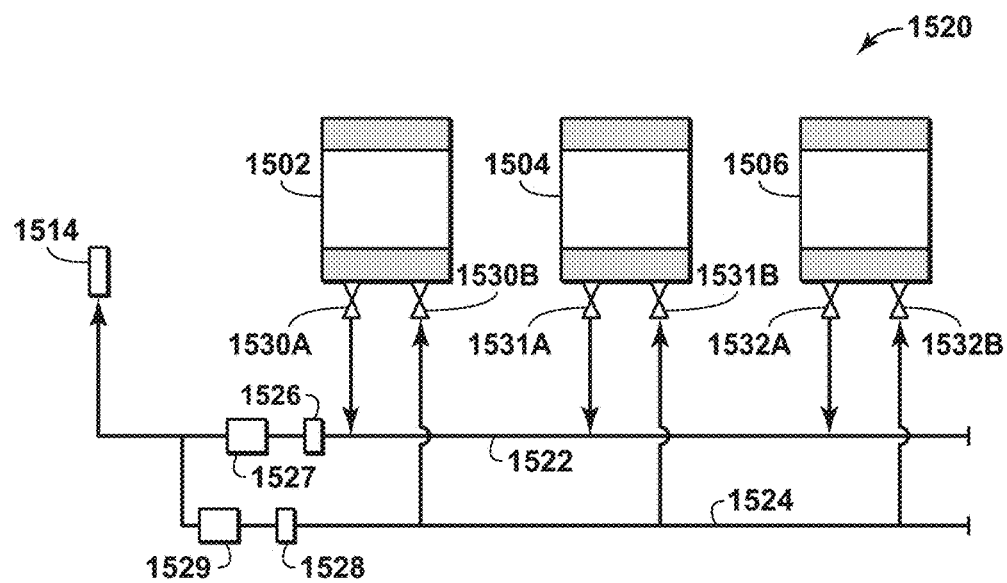

FIG. 15B is another diagram 1520 of a three adsorbent bed configuration for a swing adsorption process having adsorbent beds, PFCs 1526 and 1528 and interconnecting piping for product and purge vent header 1522 and a product repressurization header 1524 in accordance with an embodiment of the present techniques. The diagram 1520 includes a few of the components used in a system for an exemplary RCPSA process. The diagram 1520 includes steps 4 (product repressurization step), 6 (feed step) and 7 (purge step) shown in graph 300 in FIG. 3A. The diagram 1520 includes three adsorbent bed units 1502, 1504 and 1506, which each have an adsorbent bed, along with a product and purge vent header 1522 and the product re-pressurization header 1524. The product and purge vent header 1522 may maintain a product pressure, which may be about 84 bara, while product repressurization header 1524 may be maintained at a product repressurization pressure, such as about 80 bara, for example. The product and purge vent header 1522 may be fed from one or more of the adsorbent bed units 1502, 1504 and 1506, while the product repressurization header 1524 may be fed from the purge vent header 1522. The stream in the product and purge vent header 1522 may be split into the stream in product repressurization header 1524 and a stream that is supplied to a product compressor 1514 or a product pipeline. In addition, the adsorbent bed units 1502, 1504 and 1506 may include one or more valves, such as poppet valves 1530A, 1530B, 1531A, 1531B, 1532A and 1532B, which are associated with the respective adsorbent bed units 1502, 1504 and 1506.

To manage the flow fluids through the product and purge vent header 1522 and a product repressurization header 1524, various components may be installed along these headers. For example, a flow meter 1527 may be disposed in fluid communication with the product and purge vent header 1522 at a location upstream of the split between the product and purge vent header 1522 and a product repressurization header 1524. The flow meter 1527 may be used to measure the product flow rate out of the adsorbent bed units. Also, a pulsation dampener 1529 may be disposed along the flow path of the product repressurization header 1524. The pulsation dampener 1529 may include a pulsation bottle and a choke tube.

Further, the product header 1522 may include a product PFC 1526 disposed upstream of the adsorbent bed units 1502, 1504 and 1506. The product repressurization header 1524 may include a product repressurization PFC 1528 disposed upstream of the adsorbent bed units 1502, 1504 and 1506 and downstream of the pulsation bottle 1529. These PFCs reduce pressure pulsation in the product and purge vent header upstream of the PFC and in the product repressurization header downstream of the PFC.

Figure 15C:
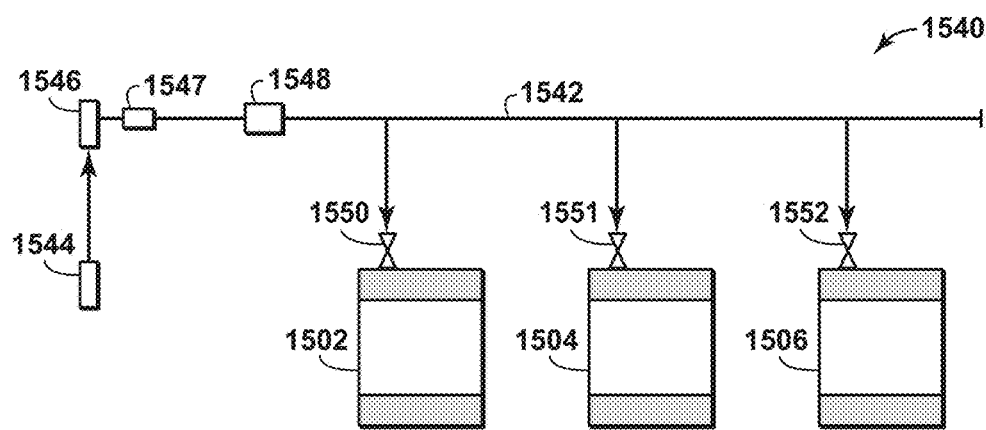

FIG. 15C is a diagram 1540 of a three adsorbent bed configuration for a swing adsorption process having adsorbent beds, PFC 1548 and interconnecting piping for the purge header 1542 in accordance with an embodiment of the present techniques. The diagram 1540 includes a few of the components used in a system for an exemplary RCPSA process. The diagram 1540 includes step 7 (purge step) shown in graph 300 in FIG. 3A. The diagram 1540 includes three adsorbent bed units 1502, 1504 and 1506 along with a purge header 1542, which may be maintained at a purge pressure (e.g., about 85 bara). The purge header 1542 may be fed from a purge compressor 1544, which may be maintained at pressure of about 89 bara. In addition, the adsorbent bed units 1502, 1504 and 1506 may include one or more valves, such as poppet valves 1550, 1551 and 1552, which are associated with the respective adsorbent bed units 1502, 1504 and 1506.

To manage the flow fluids through the purge header 1542, various components may be installed along the header. For example, a purge filter 1546 may be disposed downstream of the purge compressor 1544. The purge filter 1546 may be used to remove any solids from the purge stream. Also, a purge PFC 1548 may be disposed along the flow path of the purge header 1542, which is downstream of the purge filter 1546. Finally, a pulsation dampener 1547 may be disposed along the flow path of the purge header 1542, which is upstream of the PFC 1548 and downstream of the filter 1546. The pulsation dampener 1527 may include a pulsation bottle and a choke tube. Each of the purge filter 1546 purge PFC 1548 and pulsation dampener 1547 are disposed upstream of the adsorbent bed units 1502, 1504 and 1506.

Figure 15D:
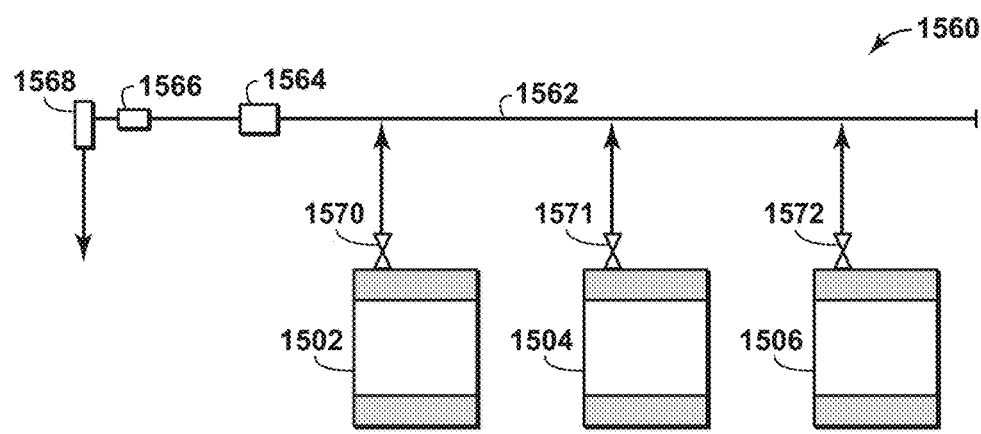

FIG. 15D is a diagram 1560 of a three adsorbent bed configuration for a swing adsorption process having adsorbent beds, PFC 1564 and interconnecting piping for the first depressurization header from the feed side 1562 in accordance with an embodiment of the present techniques. The diagram 1560 includes a few of the components used in a system for an exemplary RCPSA process. The diagram 1560 includes step 1 (first depressurization header) shown in graph 300 in FIG. 3A. The diagram 1560 includes three adsorbent bed units 1502, 1504 and 1506 along with the first depressurization header from the feed side 1562, which may be maintained at a pressure (e.g., about 54 bara). The first depressurization header from the feed side 1562 may be fed from one or more of the adsorbent bed units 1502, 1504 and 1506. The adsorbent bed units 1502, 1504 and 1506 may include one or more valves, such as poppet valves 1570, 1571 and 1572, which are associated with the respective adsorbent bed units 1502, 1504 and 1506.

To manage the flow fluids through the first depressurization header from the feed side 1562, various components may be installed along the header. For example, a PFC 1564 may be disposed downstream of the one or more of the adsorbent bed units 1502, 1504 and 1506. The PFC 1564 may be used to reduce the pressure pulsations in the header upstream of the PFC. Also, a pulsation dampener 1566 may be disposed along the flow path of the header 1562, which is downstream of the PFC 1564. The pulsation dampener 1566 may include a pulsation bottle and a choke tube. Further, a pressure control valve 1568 may be disposed along the flow path of the header 1562, which is downstream of the PFC 1564. The pressure control valve 1568 may be used to maintain the pressure of the header (e.g., about 54 bara). Each of the PFC 1564, pulsation dampener 1566 and pressure control valve 1568 are disposed downstream of the adsorbent bed units 1502, 1504 and 1506. Accordingly, the PFC may be used on a blow-down step to lessen pulsation and enhance the process.

Figure 15E:
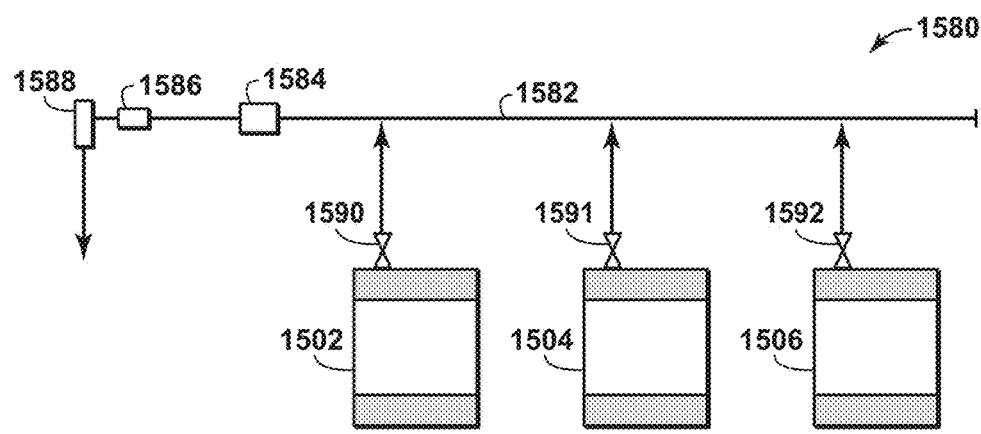

FIG. 15E is a diagram 1580 of a three adsorbent bed configuration for a swing adsorption process having adsorbent beds, PFC 1584 and interconnecting piping for the second depressurization header 1582 in accordance with an embodiment of the present techniques. The diagram 1580 includes a few of the components used in a system for an exemplary RCPSA process. The diagram 1580 includes step 2 (second depressurization header) shown in graph 300 in FIG. 3A. The diagram 1580 includes three adsorbent bed units 1502, 1504 and 1506 along with the header 1582, which may be maintained at a pressure (e.g., about 14 bara). The header 1582 may be fed from one or more of the adsorbent bed units 1502, 1504 and 1506. The adsorbent bed units 1502, 1504 and 1506 may include one or more valves, such as poppet valves 1590, 1591 and 1592, which are associated with the respective adsorbent bed units 1502, 1504 and 1506.

To manage the flow fluids through the header 1582, various components may be installed along the header. For example, a PFC 1584 may be disposed downstream of one or more of the adsorbent bed units 1502, 1504 and 1506. The PFC 1584 may be used to reduce the pressure pulsations in the header upstream of the PFC. Also, a pulsation dampener 1586 may be disposed along the flow path of the header 1582, which is downstream of the PFC 1584. The pulsation dampener 1586 may include a pulsation bottle and a choke tube. Further, pressure control valve 1588 may be disposed along the flow path of the header 1582, which is downstream of the PFC 1584. Each of the PFC 1584, pulsation dampener 1586 and pressure control valve 1588 are disposed downstream of the adsorbent bed units 1502, 1504 and 1506.

The system may include an operation controller, as noted above. The operation controller, such as operation controller 282, may be a processor based system that may be utilized to manage the operation of the poppet valve assemblies, such as poppet valve assemblies 222 to 240, through actuating means, such as actuating means 262 to 280. The operation controller also may compute the PFC algorithm and control the PFC.

Persons skilled in the technical field will readily recognize that in practical applications of the disclosed methodology (e.g., the operation of the sequencing of the poppet valves and other components utilized in these operations), it is partially performed on a computer, typically a suitably programmed digital computer. Further, some portions of the disclosure are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present techniques also relate to a system for performing the operations as described herein, which may utilize an operation controller, such as operation controller 282. The operation controller may be configured to manage the operation of the poppet valve assemblies, such as poppet valve assemblies 222 to 240, through actuating means, such as actuating means 262 to 280. This system may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the present techniques can be implemented as software, hardware, firmware or any combination of the three. Of course, wherever a component of the present techniques is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

Further, one or more embodiments may include methods that are performed by executing one or more sets of instructions to perform operational enhancements in various stages. For example, the method may include executing one or more sets of instructions to perform activation of the opening or closing of the poppet valve assemblies, such as poppet valve assemblies 222 to 240, through actuating means, such as actuating means 262 to 280 to perform a specific sequence. Further, the method may also include measurement operations.

As an example, a computer system may be utilized and configured to implement on or more of the present aspects. The computer system may include a processor; memory in communication with the processor; and a set of instructions stored on the memory and accessible by the processor, wherein the set of instructions, when executed, are configured to: perform the opening or closing of the poppet valve assemblies, such as poppet valve assemblies 222 to 240, through actuating means, such as actuating means 262 to 280 to perform a specific sequence. The set of instructions, when executed, may be configured to: receive and transmit signals between the actuating means and the operation controller to perform the opening and closing operations.

In one or more embodiments, the operation controller may include a set of instructions stored on the memory and accessible by the processor, wherein the set of instructions, when executed, are configured to monitor or measure the pulsation in one or more of the manifolds. The set of instructions, when executed, may be configured to: receive and transmit signals between one or more pulsation sensors and the operation controller to perform the monitoring of the respective headers. The pulsation sensor may include a pressure or flow rate sensor disposed in the header. Also, the set of instructions, when executed, may be configured to: provide one or more of a visual indication and audible notification associated with the status of the pulsation and/or operation of the poppet valves.

In one or more embodiments, the adsorption bed assembly may include an adsorbent bed that can be used for the separation of a target gas form a gaseous mixture. The adsorbent is usually comprised of an adsorbent material supported on a non-adsorbent support, or contactor. Non-limiting examples of the form of the adsorbent bed include beds of beaded or pelletized adsorbent particles or an adsorbent material on a structured contactor, such as a parallel channel contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the point or place at which a feed stream enters the contactor and the point or place at which a product stream leaves the contactor. In a parallel channel contactor, the adsorbent is incorporated into the wall of the flow channel. Non-limiting examples of geometric shapes of parallel channel contactors include various shaped monoliths having a plurality of substantially parallel channels extending from one end of the monolith to the other; a plurality of tubular members, stacked layers of adsorbent sheets with and without spacers between each sheet; multi-layered spiral rolls, spiral wound adsorbent sheets, bundles of hollow fibers, as well as bundles of substantially parallel solid fibers. "Parallel channel contactors" are defined as a subset of adsorbent contactors comprising structured (engineered) adsorbents in which substantially parallel flow channels are incorporated into the adsorbent structure. Parallel flow channels are described in detail in United States Patent Publication Nos. 2008/0282892 and 2008/0282886, both of which herein incorporated by reference in their entirety. These flow channels may be formed by a variety of means and in addition to the adsorbent material, the adsorbent structure may contain items such as, but not limited to, support materials, heat sink materials, void reduction components, and heating/cooling passages.

Non-limiting examples of adsorbent materials that can be used with the method and system include high surface area (>10 m2/gm and preferably >75 m2/gm) alumina, microporous zeolites (preferably zeolites with particle sizes <1 mm), other microporous materials, mesoporous materials and ordered mesoporous materials. Nonlimiting examples of these materials include carbons, cationic zeolites, high silica zeolites, highly siliceous ordered mesoporous materials, sol gel materials, ALPO materials (microporous and mesoporous materials containing predominantly aluminum phosphorous and oxygen), SAPO materials (microporous and mesoporous materials containing predominantly silicon aluminum phosphorous and oxygen), MOF materials microporous and mesoporous materials comprised of a metal organic framework) and ZIF materials (microporous and mesoporous materials comprised of zeolitic imidazolate frameworks). Other materials include microporous and mesoporous sorbents functionalized with functional groups. Examples of functional groups include primary, secondary, tertiary and other non protogenic basic groups such as amidines, guanidines and biguanides.

In one or more embodiments, the swing adsorption process using the poppet valve assembly of the present techniques is rapidly cycled, in which case the processes are referred to as rapid cycle pressure swing adsorption (RCPSA), rapid cycle temperature swing adsorption (RCTSA), and rapid cycle partial pressure swing or displacement purge adsorption (RCPPSA). For RCPSA the total cycle times are typically less than 90 seconds, preferably less than 60 seconds, preferably less than 30 seconds, preferably less than 20 seconds, more preferably less than 15 seconds, and even more preferably less than 10 seconds. For RCTSA the total cycle times are typically less than 600 seconds, preferably less than 200 seconds, more preferably less than 100 seconds, and even more preferably less than 60 seconds. Conventional PSA cycle times are typically in excess of 2 to 4 minutes.

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 volume percent (vol. %) $CO_2$, 4 parts per million (ppm) $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology may be useful for gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

In one or more embodiment, the streams provided to the adsorbent bed and removed from an adsorbent bed may have different compositions. For example, the hydrocarbon containing stream may have greater than 0.005 volume percent $CO_2$ based on the total volume of the gaseous feed stream and an adsorbent material in the adsorbent bed has a higher selectivity to $CO_2$ as compared to hydrocarbons. Also, the product stream may have greater than 98 volume percent hydrocarbons based on the total volume of the product stream. Further, the gaseous feed stream may be a hydrocarbon containing stream having greater than 20 volume percent $CO_2$ based on the total volume of the gaseous containing stream.

Further, in one or more embodiments, the pulse flow control mechanism may be configured to manage the operation of the valves (e.g., poppet valves) that manage the flow through the adsorbent beds. For example, if the adsorbent bed units include one or more poppet valves, a controller may be configured to adjust a ramp rate of one or more poppet valves to reduce pressure fluctuations in the one of the manifolds. The pulse flow controller may also be configured to maintain a substantially constant pressure within a respective manifold. Also, the pulse flow controller may be configured to operate based on a feed forward algorithm (which may be based on lift versus time values transmitted from a valve controller associated with one or more poppet valves). Specifically, the feed forward algorithm may be based on a calculation of the flow area to produce the instantaneous mass flow at each instant in time, such as equations (10a and 10b).

Further still, in one or more embodiments, PFC may be utilized in fluid communication with any of the manifolds. For example, a PFC may be upstream of the adsorbent bed units on a feed manifold associated with an adsorption step and/or upstream of the adsorbent bed units on a feed repressurization manifold associated with a feed repressurization step. Also, a PFC may be downstream of the adsorbent bed units on a product repressurization manifold that is associated with an product repressurization; a product manifold that is associated with an product step; downstream of the adsorbent bed units on a purge manifold that is associated with a purge step; downstream of the adsorbent bed units on a first product depressurization manifold that is associated with a first product depressurization step; downstream of the adsorbent bed units on a second product depressurization manifold that is associated with a second product depressurization step; downstream of the adsorbent bed units on a third product depressurization manifold that is associated with a third product depressurization step; downstream of the adsorbent bed units on a first feed depressurization manifold that is associated with a first feed depressurization step; downstream of the adsorbent bed units on a second feed depressurization manifold that is associated with a second feed depressurization step; and/or downstream of the adsorbent bed units on a third feed depressurization manifold that is associated with a third feed depressurization step.

Moreover, the pulse flow control mechanism may include a configuration using both the PFCs and the split feed headers. For example, the feed header may be separated into a primary feed header and a repressurization feed header. Each of these headers may include a separate PFC. The PFCs may be operated independently or may coordinate with each other to manage operation of the poppet valves within the system. The combination of the PFCs with the split headers may each operate to further control the pulsation.

One or more embodiments are described further below:
1. A cyclical swing adsorption process for removing contaminants from a gaseous feed stream comprising: performing a cyclical swing adsorption process by: passing a portion of a gaseous feed stream through one of a plurality of adsorbent bed units during an adsorption step, wherein the one of the plurality of adsorbent bed units is configured to separate one or more contaminants from the portion of the gaseous feed stream to form a product stream; interrupting the flow of the gaseous feed stream to the one of the plurality of adsorbent bed units; and removing one or more contaminants from the one of the plurality of adsorbent bed units during a subsequent swing adsorption process step; and repeating the cyclical swing adsorption process for a subsequent cycle; wherein each of the plurality of adsorbent bed units are in fluid communication with a plurality of manifolds, wherein one of the plurality of manifolds is in fluid communication with a pulse flow control mechanism configured to lessen pulsation within the one of the plurality of manifolds.
2. The cyclical swing adsorption process of paragraph 1, further comprising separating a feed stream into the portion of the gaseous feed stream and a repressurization stream in the pulse flow control mechanism prior to passing the gaseous feed stream to a feed manifold of the plurality of manifolds and passing the repressurization stream to feed repressurization manifold.

3. The cyclical swing adsorption process of paragraph 2, wherein the pulse flow control mechanism comprises a splitter and a pulsation dampener, wherein the splitter is positioned upstream of the feed manifold and the feed repressurization manifold.

4. The cyclical swing adsorption process of paragraph 3, wherein the pulsation dampener comprises a pulsation bottle and a choke tube.

5. The cyclical swing adsorption process of paragraph 1, wherein the pulse flow control mechanism comprises a controller configured to adjust a ramp rate of one or more of a plurality of poppet valves to reduce pressure fluctuations in the one of the plurality of manifolds, wherein each of the plurality of adsorbent bed units comprise one or more poppet valves from the plurality of poppet valves.

6. The cyclical swing adsorption process of any one of paragraphs 1 to 4, wherein the pulse flow control mechanism comprises a pulse flow controller configured to maintain a substantially constant pressure within the one of the plurality of manifolds.

7. The cyclical swing adsorption process of paragraph 6, further comprising expanding of the portion of gaseous feed stream from a pressure higher than the pressure in the one of the plurality of manifolds prior to passing the portion of the gaseous feed stream to the one of plurality of adsorbent bed units.

8. The cyclical swing adsorption process of paragraph 6, wherein the pulse flow controller is configured to operate based on a feed forward algorithm.

9. The cyclical swing adsorption process of paragraph 8, wherein each of the plurality of adsorbent bed units comprise one or more poppet valves and wherein the feed forward algorithm is based on lift versus time values transmitted from a valve controller associated with one of the one or more poppet valves.

10. The cyclical swing adsorption process of paragraph 8, wherein the feed forward algorithm is based on a calculation of the flow area to produce the instantaneous mass flow at each instant in time.

11. The cyclical swing adsorption process of paragraph 10, wherein the calculation involves solving the following equation:

$$CdA_{PCV1}(t) = CdA_{single}(t) \cdot \frac{P_{outlet} + P_{outlet} \cdot c1 - c1 \cdot pexit(t)}{P_{outlet} + P_{inlet} \cdot c1 - P_{outlet} \cdot c1} \cdot \sqrt{\frac{P_{outlet}^2 - P_{outlet} \cdot pexit(t)}{P_{inlet}^2 - P_{inlet} \cdot P_{outlet}}},$$

where $P_{outlet}$ refers to the outlet pressure of the PCV, $P_{inlet}$ refers to the pressure at the inlet of the PCV, pexit(t) is the pressure at the exit of the feed valve into the vessel, the $CdA_{PCV1}$ is the vena contracta area of one PCV to pass the flow to balance the inflow into one of the plurality of manifolds with the flow leaving the one of the plurality of manifolds at the same instant in time from the one or more poppet valves into the one of the plurality of adsorption bed units; and summing all the $CdA_{single}$ (t) over time for each of the one or more poppet valves and finding the $CdA_{PCVn}$ for each of the one or more PCV poppet valves.

12. The cyclical swing adsorption process of any one of paragraphs 6 to 11, wherein the substantially constant pressure comprises maintaining the pressure within the one of the plurality of manifolds at pressures within 8.4% of a target feed pressure.

13. The cyclical swing adsorption process of any one of paragraphs 6 to 11, wherein the substantially constant pressure comprises maintaining the pressure within the one of the plurality of manifolds at pressures within 0.002% of a target feed pressure.

14. The cyclical swing adsorption process of any one of paragraphs 6 to 11, wherein the substantially constant pressure comprises maintaining the pressure within the one of the plurality of manifolds at pressures within 8.4% of a target repressurization feed pressure.

15. The cyclical swing adsorption process of any one of paragraphs 6 to 11, wherein the substantially constant pressure comprises maintaining the pressure within the one of the plurality of manifolds at pressures within 3.5% of a target repressurization feed pressure.

16. The cyclical swing adsorption process of any one of paragraphs 6 to 11, wherein the substantially constant pressure comprises maintaining the pressure within the one of the plurality of manifolds at pressures within 7.1% of a target product repressurization pressure.

17. The cyclical swing adsorption process of any one of paragraphs 6 to 11, wherein the substantially constant pressure comprises maintaining the pressure within the one of the plurality of manifolds at pressures within 0.06% of a target product repressurization pressure.

18. The cyclical swing adsorption process of any one of paragraphs 6 to 11, wherein the substantially constant pressure comprises maintaining the pressure within the one of the plurality of manifolds at pressures within 7.1% of a target product pressure.

19. The cyclical swing adsorption process of any one of paragraphs 6 to 11, wherein the substantially constant pressure comprises maintaining the pressure within the one of the plurality of manifolds at pressures within 0.2% of a target product pressure.

20. The cyclical swing adsorption process of any one of paragraphs 6 to 11, wherein the substantially constant pressure comprises maintaining the pressure within the one of the plurality of manifolds at pressures within 6.0% of a target purge pressure.

21. The cyclical swing adsorption process of any one of paragraphs 6 to 11, wherein the substantially constant pressure comprises maintaining the pressure within the one of the plurality of manifolds at pressures within 0.05% of a target purge pressure.

22. The cyclical swing adsorption process of any one of paragraphs 6 to 11, wherein the substantially constant pressure comprises maintaining the pressure within the one of the plurality of manifolds at pressures within 13.1% of a target first product depressurization pressure.

23. The cyclical swing adsorption process of any one of paragraphs 6 to 11, wherein the substantially constant pressure comprises maintaining the pressure within the one of the plurality of manifolds at pressures within 0.9% of a target first product depressurization pressure.

24. The cyclical swing adsorption process of any one of paragraphs 6 to 11, wherein the substantially constant pressure comprises maintaining the pressure within the one of the plurality of manifolds at pressures within 37.2% of a target second product depressurization pressure.

25. The cyclical swing adsorption process of any one of paragraphs 6 to 11, wherein the substantially constant pressure comprises maintaining the pressure within the one of the plurality of manifolds at pressures within 7.1% of a target second product depressurization pressure.

26. The cyclical swing adsorption process of any one of paragraphs 6 to 11, wherein the substantially constant pressure comprises maintaining the pressure within the one of the plurality of manifolds at pressures within 69.3% of a target third product depressurization pressure.
27. The cyclical swing adsorption process of any one of paragraphs 6 to 11, wherein the substantially constant pressure comprises maintaining the pressure within the one of the plurality of manifolds at pressures within 10.1% of a target third product depressurization pressure.
28. The cyclical swing adsorption process of any one of paragraphs 6 to 11, wherein the substantially constant pressure comprises maintaining the pressure within the one of the plurality of manifolds at pressures within 1.6% of a target first feed depressurization pressure.
29. The cyclical swing adsorption process of any one of paragraphs 6 to 11, wherein the substantially constant pressure comprises maintaining the pressure within the one of the plurality of manifolds at pressures within 0.1% of a target first feed depressurization pressure.
30. The cyclical swing adsorption process of any one of paragraphs 6 to 11, wherein the substantially constant pressure comprises maintaining the pressure within the one of the plurality of manifolds at pressures within 5.2% of a target second feed depressurization pressure.
31. The cyclical swing adsorption process of any one of paragraphs 6 to 11, wherein the substantially constant pressure comprises maintaining the pressure within t the one of the plurality of manifolds at pressures within 0.6% of a target second feed depressurization pressure.
32. The cyclical swing adsorption process of any one of paragraphs 6 to 11, wherein the substantially constant pressure comprises maintaining the pressure within the one of the plurality of manifolds at pressures within 53.6% of a target third feed depressurization pressure.
33. The cyclical swing adsorption process of any one of paragraphs 6 to 11, wherein the substantially constant pressure comprises maintaining the pressure within the one of the plurality of manifolds at pressures within 7.7% of a target third feed depressurization pressure.
34. The cyclical swing adsorption process of any one of paragraphs 1 to 33, wherein the subsequent swing adsorption process step comprises: performing one or more depressurization steps in the one of the plurality of adsorbent bed units, wherein each depressurization step comprises passing a portion of the gas from the one of the plurality of adsorbent bed units to a location external to the one of a plurality of adsorbent bed units and reduces the pressure within the adsorbent bed unit.
35. The cyclical swing adsorption process of any one of paragraphs 1 to 33, wherein the subsequent swing adsorption process step comprises: performing one or more purge steps in the one of the plurality of adsorbent bed units, wherein each purge step comprises passing a portion of the gas from a location external to the one of a plurality of adsorbent bed units to the one of the plurality of adsorbent bed units.
36. The cyclical swing adsorption process of one of paragraphs 1 to 33, wherein performing the cyclical swing adsorption process further comprises performing one or more repressurization steps in the one of the plurality of adsorbent bed units, wherein each repressurization step comprises passing a portion of the gaseous feed stream to the one of the plurality of adsorbent bed units to increase the pressure within the one of the plurality of adsorbent bed units.
37. The cyclical swing adsorption process of any one of paragraphs 1 to 36, wherein the cycle is performed in a time interval less than about 90 seconds.
38. The cyclical swing adsorption process of any one of paragraphs 1 to 36, wherein the cycle is performed in a time interval less than about 20 seconds.
39. The cyclical swing adsorption process of any one of paragraphs 1 to 38, wherein the hydrocarbon containing stream has greater than 0.005 volume percent $CO_2$ based on the total volume of the gaseous feed stream and an adsorbent material in the adsorbent bed has a higher selectivity to $CO_2$ as compared to hydrocarbons.
40. The cyclical swing adsorption process of any one of paragraphs 1 to 38, wherein the product stream has greater than 98 volume percent hydrocarbons based on the total volume of the product stream.
41. The cyclical swing adsorption process of any one of paragraphs 1 to 38, wherein the gaseous feed stream is a hydrocarbon containing stream having greater than 20 volume percent $CO_2$ based on the total volume of the gaseous containing stream.
42. A cyclical swing adsorption system comprising: a plurality of manifolds, wherein each manifold of the plurality of manifolds is associated with one swing adsorption process step of a plurality of swing adsorption process steps; a plurality of adsorbent bed units coupled to the plurality of manifolds, each of the adsorbent bed units comprising: a housing; an adsorbent material disposed within the housing; a plurality of valves, wherein at least one of the plurality of valves is associated with one of the plurality of manifolds and is configured to manage fluid flow along a flow path extending between the respective manifold and the adsorbent material; a pulse flow control mechanism in fluid communication with one of the plurality of manifolds and configured to lessen pulsation within the one of the plurality of manifolds.
43. The cyclical swing adsorption system of paragraph 42, wherein the plurality of valves comprise one or more poppet valves.
44. The cyclical swing adsorption system of any one of paragraphs 42 to 43, wherein plurality of manifolds, the plurality of adsorbent bed units and a pulse flow control mechanism are configured to operate at pressures between 0.1 bar absolute (bara) and 100 bara.
45. The cyclical swing adsorption system of any one of the paragraphs 42 to 44, wherein the pulse flow control mechanism comprises splitter and a pulsation dampener disposed upstream of the plurality of adsorbent bed units, wherein the splitter and pulsation dampener are configured to separate a feed stream into a feed manifold of the plurality of manifolds that is associated with an adsorption step of the plurality of swing adsorption process steps and a feed repressurization manifold the plurality of manifolds that is associated with a feed repressurization step of the plurality of swing adsorption process steps.
46. The cyclical swing adsorption system of paragraph 45, wherein the pulsation dampener comprises a pulsation bottle and a choke tube.
47. The cyclical swing adsorption system of any one of paragraphs 42 to 46, wherein the pulse flow control mechanism comprises a controller in communication with one or more of the plurality of valves and is configured to adjust a ramp rate of one or more of the plurality of valves to reduce pressure fluctuations in the one of the plurality of manifolds.
48. The cyclical swing adsorption system of any one of paragraphs 42 to 46, wherein the pulse flow control mechanism comprises a pulse flow controller configured to maintain a substantially constant pressure within the one of the plurality of manifolds.

49. The cyclical swing adsorption system of paragraph 48, wherein the pulse flow controller is configured to operate based on a feed forward algorithm.

50. The cyclical swing adsorption system of paragraph 49, wherein the pulse flow controller is configured to solve the feed forward algorithm based on lift versus time values transmitted from a valve controller associated with one of the one or more poppet valves that are in fluid communication with the one of the plurality of manifolds.

51. The cyclical swing adsorption system of paragraph 49, wherein the pulse flow controller is configured to solve the feed forward algorithm to produce the instantaneous mass flow at each instant in time for one of the plurality of manifolds.

52. The cyclical swing adsorption system of paragraph 51, wherein the pulse flow controller is configured to solve the following equation:

$$CdA_{PCV1}(t) = CdA_{single}(t) \cdot \frac{P_{outlet} + P_{outlet} \cdot c1 - c1 \cdot pexit(t)}{P_{outlet} + P_{inlet} \cdot c1 - P_{outlet} \cdot c1} \cdot \sqrt{\frac{P_{outlet}^2 - P_{outlet} \cdot pexit(t)}{P_{inlet}^2 - P_{inlet} \cdot P_{outlet}}},$$

where $P_{outlet}$ refers to the outlet pressure of the PCV, $P_{inlet}$ refers to the pressure at the inlet of the PCV, pexit(t) is the pressure at the exit of the feed valve into the vessel, the $CdA_{PCV1}$ is the vena contracta area of one PCV to pass the flow to balance the inflow into one of the plurality of manifolds with the flow leaving the one of the plurality of manifolds at the same instant in time from the one or more poppet valves into the one of the plurality of adsorption bed units; and summing all the $CdA_{single}(t)$ over time for each of the one or more poppet valves and finding the $CdA_{PCVn}$ for each of the one or more PCV poppet valves.

53. The cyclical swing adsorption system of any one of paragraphs 48 to 52, wherein the one of the plurality of manifolds is a feed manifold that is associated with an adsorption step of the plurality of swing adsorption process steps and the pulse flow controller is disposed upstream of the plurality of absorbent bed units.

54. The cyclical swing adsorption system of any one of paragraphs 48 to 52, wherein the one of the plurality of manifolds is a feed repressurization manifold that is associated with an feed repressurization step of the plurality of swing adsorption process steps and the pulse flow controller is disposed upstream of the plurality of absorbent bed units.

55. The cyclical swing adsorption system of any one of paragraphs 48 to 52, wherein the one of the plurality of manifolds is a product repressurization manifold that is associated with an product repressurization step of the plurality of swing adsorption process steps and the pulse flow controller is disposed downstream of the plurality of absorbent bed units.

56. The cyclical swing adsorption system of any one of paragraphs 48 to 52, wherein the one of the plurality of manifolds is a product manifold that is associated with an product step of the plurality of swing adsorption process steps and the pulse flow controller is disposed downstream of the plurality of absorbent bed units.

57. The cyclical swing adsorption system of any one of paragraphs 48 to 52, wherein the one of the plurality of manifolds is a purge manifold that is associated with a purge step of the plurality of swing adsorption process steps and the pulse flow controller is disposed downstream of the plurality of absorbent bed units.

58. The cyclical swing adsorption system of any one of paragraphs 48 to 52, wherein the one of the plurality of manifolds is a first product depressurization manifold that is associated with a first product depressurization step of the plurality of swing adsorption process steps and the pulse flow controller is disposed downstream of the plurality of absorbent bed units.

59. The cyclical swing adsorption system of any one of paragraphs 48 to 52, wherein the one of the plurality of manifolds is a second product depressurization manifold that is associated with a second product depressurization step of the plurality of swing adsorption process steps and the pulse flow controller is disposed downstream of the plurality of absorbent bed units.

60. The cyclical swing adsorption system of any one of paragraphs 48 to 52, wherein the one of the plurality of manifolds is a third product depressurization manifold that is associated with a third product depressurization step of the plurality of swing adsorption process steps and the pulse flow controller is disposed downstream of the plurality of absorbent bed units.

61. The cyclical swing adsorption system of any one of paragraphs 48 to 52, wherein the one of the plurality of manifolds is a first feed depressurization manifold that is associated with a first feed depressurization step of the plurality of swing adsorption process steps and the pulse flow controller is disposed downstream of the plurality of absorbent bed units.

62. The cyclical swing adsorption system of any one of paragraphs 48 to 52, wherein the one of the plurality of manifolds is a second feed depressurization manifold that is associated with a second feed depressurization step of the plurality of swing adsorption process steps and the pulse flow controller is disposed downstream of the plurality of absorbent bed units.

63. The cyclical swing adsorption system of any one of paragraphs 48 to 52, wherein the one of the plurality of manifolds is a third feed depressurization manifold that is associated with a third feed depressurization step of the plurality of swing adsorption process steps and the pulse flow controller is disposed downstream of the plurality of absorbent bed units.

64. The cyclical swing adsorption system of any one of paragraphs 48 to 63, wherein the plurality of swing adsorption process steps are performed in a time interval less than about 90 seconds.

65. The cyclical swing adsorption system of any one of paragraphs 48 to 63, wherein the plurality of swing adsorption process steps are performed in a time interval less than about 20 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A cyclical swing adsorption process for removing contaminants from a gaseous feed stream comprising:
   performing a cyclical swing adsorption process by:
   passing a portion of a gaseous feed stream through one of a plurality of adsorbent bed units during an adsorption step, wherein the one of the plurality of adsorbent bed units is configured to separate one or more contaminants from the portion of the gaseous feed stream to form a product stream;

interrupting the flow of the gaseous feed stream to the one of the plurality of adsorbent bed units; and removing one or more contaminants from the one of the plurality of adsorbent bed units during a subsequent swing adsorption process step; and repeating the cyclical swing adsorption process for a subsequent cycle;

wherein each of the plurality of adsorbent bed units are in fluid communication with a plurality of manifolds, wherein one of the plurality of manifolds is in fluid communication with a pulse flow control mechanism configured to lessen pulsation within the one of the plurality of manifolds; and separating a feed stream into the portion of the gaseous feed stream and a repressurization stream in the pulse flow control mechanism prior to passing the gaseous feed stream to a feed manifold of the plurality of manifolds.

2. The cyclical swing adsorption process of claim 1, further comprising passing the repressurization stream to a feed repressurization manifold.

3. The cyclical swing adsorption process of claim 2, wherein the pulse flow control mechanism comprises a splitter and a pulsation dampener, wherein the splitter is positioned upstream of the feed manifold and the feed repressurization manifold.

4. The cyclical swing adsorption process of claim 3, wherein the pulsation dampener comprises a pulsation bottle and a choke tube.

5. The cyclical swing adsorption process of claim 1, wherein the subsequent swing adsorption process step comprises: performing one or more depressurization steps in the one of the plurality of adsorbent bed units, wherein each depressurization step comprises passing a portion of the gas from the one of the plurality of adsorbent bed units to a location external to the one of a plurality of adsorbent bed units and reduces the pressure within the adsorbent bed unit.

6. The cyclical swing adsorption process of claim 1, wherein the subsequent swing adsorption process step comprises: performing one or more purge steps in the one of the plurality of adsorbent bed units, wherein each purge step comprises passing a portion of the gas from a location external to the one of a plurality of adsorbent bed units to the one of the plurality of adsorbent bed units.

7. The cyclical swing adsorption process of claim 1, wherein performing the cyclical swing adsorption process further comprises performing one or more repressurization steps in the one of the plurality of adsorbent bed units, wherein each repressurization step comprises passing a portion of the gaseous feed stream to the one of the plurality of adsorbent bed units to increase the pressure within the one of the plurality of adsorbent bed units.

8. The cyclical swing adsorption process of claim 1, wherein the cycle is performed in a time interval less than about 90 seconds.

9. The cyclical swing adsorption process of claim 1, wherein the cycle is performed in a time interval less than about 20 seconds.

10. The cyclical swing adsorption process of claim 1, wherein the gaseous feed stream is a hydrocarbon containing stream has greater than 0.005 volume percent $CO_2$ based on the total volume of the gaseous feed stream and an adsorbent material in the adsorbent bed has a higher selectivity to $CO_2$ as compared to hydrocarbons.

11. The cyclical swing adsorption process of claim 1, wherein the product stream has greater than 98 volume percent hydrocarbons based on the total volume of the product stream.

12. The cyclical swing adsorption process of claim 1, wherein the gaseous feed stream is a hydrocarbon containing stream having greater than 20 volume percent $CO_2$ based on the total volume of the gaseous containing stream.

13. A cyclical swing adsorption system comprising:
a plurality of manifolds, wherein each manifold of the plurality of manifolds is associated with one swing adsorption process step of a plurality of swing adsorption process steps;
a plurality of adsorbent bed units coupled to the plurality of manifolds, each of the adsorbent bed units comprising:
a housing;
an adsorbent material disposed within the housing;
a plurality of valves, wherein at least one of the plurality of valves is associated with one of the plurality of manifolds and is configured to manage fluid flow along a flow path extending between the respective manifold and the adsorbent material;
a pulse flow control mechanism in fluid communication with one of the plurality of manifolds and configured to lessen pulsation within the one of the plurality of manifolds, wherein the pulse flow control mechanism comprises splitter and a pulsation dampener disposed upstream of the plurality of adsorbent bed units, wherein the splitter and pulsation dampener are configured to separate a feed stream into a feed manifold of the plurality of manifolds that is associated with an adsorption step of the plurality of swing adsorption process steps and a feed repressurization manifold the plurality of manifolds that is associated with a feed repressurization step of the plurality of swing adsorption process steps.

14. The cyclical swing adsorption system of claim 13, wherein the plurality of valves comprise one or more poppet valves.

15. The cyclical swing adsorption system of claim 13, wherein plurality of manifolds, the plurality of adsorbent bed units and a pulse flow control mechanism are configured to operate at pressures between 0.1 bar absolute (bara) and 100 bara.

16. The cyclical swing adsorption system of claim 13, wherein the pulsation dampener comprises a pulsation bottle and a choke tube.

17. A cyclical swing adsorption process for removing contaminants from a gaseous feed stream comprising:
performing a cyclical swing adsorption process by:
passing a portion of a gaseous feed stream through one of a plurality of adsorbent bed units during an adsorption step, wherein the one of the plurality of adsorbent bed units is configured to separate one or more contaminants from the portion of the gaseous feed stream to form a product stream;
interrupting the flow of the gaseous feed stream to the one of the plurality of adsorbent bed units; and
removing one or more contaminants from the one of the plurality of adsorbent bed units during a subsequent swing adsorption process step; and
repeating the cyclical swing adsorption process for a subsequent cycle;
wherein each of the plurality of adsorbent bed units are in fluid communication with a plurality of manifolds, wherein one of the plurality of manifolds is in fluid communication with a pulse flow control mechanism configured to lessen pulsation within the one of the plurality of manifolds and wherein the pulse flow control mechanism comprises a controller configured to adjust a ramp rate of one or more of a plurality of poppet valves to reduce pressure fluctuations in the one of the plurality of manifolds, wherein each of the plurality of adsorbent bed units comprise one or more poppet valves from the plurality of poppet valves.

18. The cyclical swing adsorption process of claim 17, wherein the subsequent swing adsorption process step comprises: performing one or more depressurization steps in the one of the plurality of adsorbent bed units, wherein each depressurization step comprises passing a portion of the gas from the one of the plurality of adsorbent bed units to a location external to the one of a plurality of adsorbent bed units and reduces the pressure within the adsorbent bed unit.

19. The cyclical swing adsorption process of claim 17, wherein the subsequent swing adsorption process step comprises: performing one or more purge steps in the one of the plurality of adsorbent bed units, wherein each purge step comprises passing a portion of the gas from a location external to the one of a plurality of adsorbent bed units to the one of the plurality of adsorbent bed units.

20. The cyclical swing adsorption process of claim 17, wherein performing the cyclical swing adsorption process further comprises performing one or more repressurization steps in the one of the plurality of adsorbent bed units, wherein each repressurization step comprises passing a portion of the gaseous feed stream to the one of the plurality of adsorbent bed units to increase the pressure within the one of the plurality of adsorbent bed units.

21. The cyclical swing adsorption process of claim 17, wherein the cycle is performed in a time interval less than about 90 seconds.

22. The cyclical swing adsorption process of claim 17, wherein the cycle is performed in a time interval less than about 20 seconds.

23. The cyclical swing adsorption process of claim 17, wherein the gaseous feed stream is a hydrocarbon containing stream has greater than 0.005 volume percent $CO_2$ based on the total volume of the gaseous feed stream and an adsorbent material in the adsorbent bed has a higher selectivity to $CO_2$ as compared to hydrocarbons.

24. The cyclical swing adsorption process of claim 17, wherein the product stream has greater than 98 volume percent hydrocarbons based on the total volume of the product stream.

25. The cyclical swing adsorption process of claim 18, wherein the gaseous feed stream is a hydrocarbon containing stream having greater than 20 volume percent $CO_2$ based on the total volume of the gaseous containing stream.

26. A cyclical swing adsorption system comprising:
a plurality of manifolds, wherein each manifold of the plurality of manifolds is associated with one swing adsorption process step of a plurality of swing adsorption process steps;
a plurality of adsorbent bed units coupled to the plurality of manifolds, each of the adsorbent bed units comprising:
a housing;
an adsorbent material disposed within the housing;
a plurality of valves, wherein at least one of the plurality of valves is associated with one of the plurality of manifolds and is configured to manage fluid flow along a flow path extending between the respective manifold and the adsorbent material;
a pulse flow control mechanism in fluid communication with one of the plurality of manifolds and configured to lessen pulsation within the one of the plurality of manifolds and wherein the pulse flow control mechanism comprises a controller in communication with one or more of the plurality of valves and is configured to adjust a ramp rate of one or more of the plurality of valves to reduce pressure fluctuations in the one of the plurality of manifolds.

27. The cyclical swing adsorption system of claim 26, wherein the plurality of valves comprise one or more poppet valves.

28. The cyclical swing adsorption system of claim 26, wherein plurality of manifolds, the plurality of adsorbent bed units and a pulse flow control mechanism are configured to operate at pressures between 0.1 bar absolute (bara) and 100 bara.

29. A cyclical swing adsorption process for removing contaminants from a gaseous feed stream comprising:
performing a cyclical swing adsorption process by:
passing a portion of a gaseous feed stream through one of a plurality of adsorbent bed units during an adsorption step, wherein the one of the plurality of adsorbent bed units is configured to separate one or more contaminants from the portion of the gaseous feed stream to form a product stream;
interrupting the flow of the gaseous feed stream to the one of the plurality of adsorbent bed units; and
removing one or more contaminants from the one of the plurality of adsorbent bed units during a subsequent swing adsorption process step; and
repeating the cyclical swing adsorption process for a subsequent cycle;
wherein each of the plurality of adsorbent bed units are in fluid communication with a plurality of manifolds, wherein one of the plurality of manifolds is in fluid communication with a pulse flow control mechanism configured to lessen pulsation within the one of the plurality of manifolds; wherein the pulse flow control mechanism comprises a pulse flow controller configured to maintain a substantially constant pressure within the one of the plurality of manifolds and wherein the pulse flow controller is configured to operate based on a feed forward algorithm.

30. The cyclical swing adsorption process of claim 29, further comprising expanding of the portion of gaseous feed stream from a pressure higher than the pressure in the one of the plurality of manifolds prior to passing the portion of the gaseous feed stream to the one of plurality of adsorbent bed units.

31. The cyclical swing adsorption process of claim 29, wherein each of the plurality of adsorbent bed units comprise one or more poppet valves and wherein the feed forward algorithm is based on lift versus time values transmitted from a valve controller associated with one of the one or more poppet valves.

32. The cyclical swing adsorption process of claim 29, wherein the feed forward algorithm is based on a calculation of a flow area to produce the instantaneous mass flow at each instant in time.

33. The cyclical swing adsorption process of claim 32, wherein the calculation involves solving the following equation:

$$CdA_{PCV1}(t) =$$

$$CdA_{single}(t) \cdot \frac{P_{outlet} + P_{outlet} \cdot c1 - c1 \cdot pexit(t)}{P_{outlet} + P_{inlet} \cdot c1 - P_{outlet} \cdot c1} \cdot \sqrt{\frac{P_{outlet}^2 - P_{oulet} \cdot pexit(t)}{P_{inlet}^2 - P_{inlet} \cdot P_{outlet}}}$$

where $P_{outlet}$ refers to the outlet pressure of the PCV, $P_{inlet}$ refers to the pressure at the inlet of the PCV, pexit(t) is the pressure at the exit of the feed valve into the vessel, the $CdA_{PCV1}$ is the vena contracta area of one PCV to pass the flow to balance the inflow into one of the plurality of manifolds with the flow leaving the one of the plurality of manifolds at the same instant in time from the one or more poppet valves into the one of the plurality of adsorption bed units; and summing all the $CdA_{single}(t)$ over time for each of the one or more poppet valves and finding the $CdA_{PCVn}$ for each of the one or more PCV poppet valves.

34. The cyclical swing adsorption process of claim 29, wherein the subsequent swing adsorption process step comprises: performing one or more depressurization steps in the one of the plurality of adsorbent bed units, wherein each depressurization step comprises passing a portion of the gas from the one of the plurality of adsorbent bed units to a location external to the one of a plurality of adsorbent bed units and reduces the pressure within the adsorbent bed unit.

35. The cyclical swing adsorption process of claim 29, wherein the subsequent swing adsorption process step comprises: performing one or more purge steps in the one of the plurality of adsorbent bed units, wherein each purge step comprises passing a portion of the gas from a location external to the one of a plurality of adsorbent bed units to the one of the plurality of adsorbent bed units.

36. The cyclical swing adsorption process of claim 29, wherein performing the cyclical swing adsorption process further comprises performing one or more repressurization steps in the one of the plurality of adsorbent bed units, wherein each repressurization step comprises passing a portion of the gaseous feed stream to the one of the plurality of adsorbent bed units to increase the pressure within the one of the plurality of adsorbent bed units.

37. The cyclical swing adsorption process of claim 29, wherein the cycle is performed in a time interval less than about 90 seconds.

38. The cyclical swing adsorption process of claim 29, wherein the cycle is performed in a time interval less than about 20 seconds.

39. The cyclical swing adsorption process of claim 29, wherein the gaseous feed stream is a hydrocarbon containing stream has greater than 0.005 volume percent $CO_2$ based on the total volume of the gaseous feed stream and an adsorbent material in the adsorbent bed has a higher selectivity to $CO_2$ as compared to hydrocarbons.

40. The cyclical swing adsorption process of claim 29, wherein the product stream has greater than 98 volume percent hydrocarbons based on the total volume of the product stream.

41. The cyclical swing adsorption process of claim 29, wherein the gaseous feed stream is a hydrocarbon containing stream having greater than 20 volume percent $CO_2$ based on the total volume of the gaseous containing stream.

42. A cyclical swing adsorption system comprising:
a plurality of manifolds, wherein each manifold of the plurality of manifolds is associated with one swing adsorption process step of a plurality of swing adsorption process steps;
a plurality of adsorbent bed units coupled to the plurality of manifolds, each of the adsorbent bed units comprising:
a housing;
an adsorbent material disposed within the housing;
a plurality of valves, wherein at least one of the plurality of valves is associated with one of the plurality of manifolds and is configured to manage fluid flow along a flow path extending between the respective manifold and the adsorbent material;
a pulse flow control mechanism in fluid communication with one of the plurality of manifolds and configured to lessen pulsation within the one of the plurality of manifolds, wherein the pulse flow control mechanism comprises a pulse flow controller configured to maintain a substantially constant pressure within the one of the plurality of manifolds and the pulse flow controller is configured to operate based on a feed forward algorithm.

43. The cyclical swing adsorption system of claim 42, wherein the plurality of valves comprise one or more poppet valves.

44. The cyclical swing adsorption system of claim 42, wherein plurality of manifolds, the plurality of adsorbent bed units and a pulse flow control mechanism are configured to operate at pressures between 0.1 bar absolute (bara) and 100 bara.

45. The cyclical swing adsorption system of claim 42, wherein the pulse flow controller is configured to solve the feed forward algorithm based on lift versus time values transmitted from a valve controller associated with one of the one or more poppet valves that are in fluid communication with the one of the plurality of manifolds.

46. The cyclical swing adsorption system of claim 42, wherein the pulse flow controller is configured to solve the feed forward algorithm to produce the instantaneous mass flow at each instant in time for one of the plurality of manifolds.

47. The cyclical swing adsorption system of claim 46, wherein the pulse flow controller is configured to solve the following equation:

$$CdA_{PCV1}(t) =$$

$$CdA_{single}(t) \cdot \frac{P_{outlet} + P_{outlet} \cdot c1 - c1 \cdot pexit(t)}{P_{outlet} + P_{inlet} \cdot c1 - P_{outlet} \cdot c1} \cdot \sqrt{\frac{P_{outlet}^2 - P_{oulet} \cdot pexit(t)}{P_{inlet}^2 - P_{inlet} \cdot P_{outlet}}}$$

where $P_{outlet}$ refers to the outlet pressure of the PCV, $P_{inlet}$ refers to the pressure at the inlet of the PCV, pexit(t) is the pressure at the exit of the feed valve into the vessel, the $CdA_{PCV1}$ is the vena contracta area of one PCV to pass the flow to balance the inflow into one of the plurality of manifolds with the flow leaving the one of the plurality of manifolds at the same instant in time from the one or more poppet valves into the one of the plurality of adsorption bed units; and summing all the $CdA_{single}(t)$ over time for each of the one or more poppet valves and finding the $CdA_{PCVn}$ for each of the one or more PCV poppet valves.

48. The cyclical swing adsorption system of claim 42, wherein the one of the plurality of manifolds is a feed manifold that is associated with an adsorption step of the plurality of swing adsorption process steps and the pulse flow controller is disposed upstream of the plurality of absorbent bed units.

49. The cyclical swing adsorption system of claim 42, wherein the one of the plurality of manifolds is a feed repressurization manifold that is associated with an feed repressurization step of the plurality of swing adsorption process steps and the pulse flow controller is disposed upstream of the plurality of absorbent bed units.

50. The cyclical swing adsorption system of claim 42, wherein the one of the plurality of manifolds is a product repressurization manifold that is associated with an product repressurization step of the plurality of swing adsorption process steps and the pulse flow controller is disposed downstream of the plurality of absorbent bed units.

51. The cyclical swing adsorption system of claim 42, wherein the one of the plurality of manifolds is a product manifold that is associated with an product step of the plurality of swing adsorption process steps and the pulse flow controller is disposed downstream of the plurality of absorbent bed units.

52. The cyclical swing adsorption system of claim 42, wherein the one of the plurality of manifolds is a purge manifold that is associated with a purge step of the plurality of swing adsorption process steps and the pulse flow controller is disposed downstream of the plurality of absorbent bed units.

53. The cyclical swing adsorption system of claim 42, wherein the one of the plurality of manifolds is a first product depressurization manifold that is associated with a first product depressurization step of the plurality of swing adsorption process steps and the pulse flow controller is disposed downstream of the plurality of absorbent bed units.

54. The cyclical swing adsorption system of claim 42, wherein the one of the plurality of manifolds is a second product depressurization manifold that is associated with a second product depressurization step of the plurality of swing adsorption process steps and the pulse flow controller is disposed downstream of the plurality of absorbent bed units.

55. The cyclical swing adsorption system of claim 42, wherein the one of the plurality of manifolds is a third product depressurization manifold that is associated with a third product depressurization step of the plurality of swing adsorption process steps and the pulse flow controller is disposed downstream of the plurality of absorbent bed units.

56. The cyclical swing adsorption system of claim 42, wherein the one of the plurality of manifolds is a first feed depressurization manifold that is associated with a first feed depressurization step of the plurality of swing adsorption process steps and the pulse flow controller is disposed downstream of the plurality of absorbent bed units.

57. The cyclical swing adsorption system of claim 42, wherein the one of the plurality of manifolds is a second feed depressurization manifold that is associated with a second feed depressurization step of the plurality of swing adsorption process steps and the pulse flow controller is disposed downstream of the plurality of absorbent bed units.

58. The cyclical swing adsorption system of claim 42, wherein the one of the plurality of manifolds is a third feed depressurization manifold that is associated with a third feed depressurization step of the plurality of swing adsorption process steps and the pulse flow controller is disposed downstream of the plurality of absorbent bed units.

59. The cyclical swing adsorption system of claim 42, wherein the plurality of swing adsorption process steps are performed in a time interval less than about 90 seconds.

60. The cyclical swing adsorption system of claim 42, wherein the plurality of swing adsorption process steps are performed in a time interval less than about 20 seconds.

* * * * *